United States Patent
Ji et al.

(10) Patent No.: US 11,323,209 B2
(45) Date of Patent: *May 3, 2022

(54) MODEM CHIPS AND RECEIVERS FOR PERFORMING HYBRID AUTOMATIC REPEAT REQUEST PROCESSING

(71) Applicant: Samsung Electronics Co., Ltd., Suwon-si (KR)

(72) Inventors: Ho-guen Ji, Hwaseong-si (KR); Hyoung-min Ko, Suwon-si (KR); Jung-eun Lee, Seoul (KR); Ki-joon Hong, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/913,494

(22) Filed: Jun. 26, 2020

(65) Prior Publication Data

US 2020/0328851 A1 Oct. 15, 2020

Related U.S. Application Data

(63) Continuation of application No. 16/227,907, filed on Dec. 20, 2018, now Pat. No. 10,700,820.

(30) Foreign Application Priority Data

Dec. 21, 2017 (KR) .................. 10-2017-0177490
Oct. 24, 2018 (KR) .................. 10-2018-0127702

(51) Int. Cl.
*H04L 1/18* (2006.01)
*H04L 1/08* (2006.01)
*H04L 43/0823* (2022.01)

(52) U.S. Cl.
CPC .............. *H04L 1/1816* (2013.01); *H04L 1/08* (2013.01); *H04L 1/1812* (2013.01); *H04L 43/0847* (2013.01)

(58) Field of Classification Search
None
See application file for complete search history.

(56) References Cited

U.S. PATENT DOCUMENTS 8,065,595 B2 * 11/2011 Kim ...................... H04L 1/1819
714/790
8,085,735 B2 12/2011 Suzuki et al.
(Continued)

FOREIGN PATENT DOCUMENTS

JP 2017-123624 A 7/2017
KR 10-2015-0040192 A 4/2015

*Primary Examiner* — Mujtaba M Chaudry
(74) *Attorney, Agent, or Firm* — Harness, Dickey & Pierce, P.L.C.

(57) ABSTRACT

A modem chip for supporting combination of data repeatedly transmitted based on hybrid automatic repeat request (HARQ) is provided. The modem chip includes an HARQ combiner configured to perform a HARQ combination by combining retransmitted data with the previous HARQ data, the retransmitted data including retransmitted control channel data received via a control channel and retransmitted data channel data received via a data channel, the previous HARQ data corresponding to data received via the control channel and the data channel, the HARQ combination generating updated HARQ data, a memory configured to store the previous HARQ data and the updated HARQ data, and a memory controller configured to control transmission of the previous HARQ data and the updated HARQ data between the HARQ combiner and the HARQ memory.

20 Claims, 19 Drawing Sheets

(56) References Cited

U.S. PATENT DOCUMENTS

| | | | |
|---|---|---|---|
| 8,271,843 B2* | 9/2012 | Tseng | H04L 1/1845 |
| | | | 714/748 |
| 9,078,236 B2 | 7/2015 | Chun et al. | |
| 2007/0177569 A1* | 8/2007 | Lundby | H04L 1/0072 |
| | | | 370/349 |
| 2008/0095109 A1* | 4/2008 | Malladi | H04L 1/1858 |
| | | | 370/330 |
| 2008/0133995 A1* | 6/2008 | Lohr | H04L 1/1854 |
| | | | 714/748 |
| 2009/0147724 A1* | 6/2009 | Nimbalker | H04L 1/1874 |
| | | | 370/315 |
| 2009/0158109 A1* | 6/2009 | Park | H04L 1/1812 |
| | | | 714/748 |
| 2009/0307554 A1* | 12/2009 | Marinier | H04L 1/1845 |
| | | | 714/748 |
| 2010/0005358 A1* | 1/2010 | Lim | H04L 1/1896 |
| | | | 714/749 |
| 2013/0251011 A1* | 9/2013 | Ventola | H04L 27/265 |
| | | | 375/222 |
| 2014/0344638 A1* | 11/2014 | Taguchi | H04L 1/08 |
| | | | 714/748 |
| 2016/0218830 A1* | 7/2016 | Martinez | H04L 1/1845 |
| 2016/0295584 A1 | 10/2016 | Chen et al. | |
| 2016/0345300 A1* | 11/2016 | Kim | H04L 5/0053 |
| 2017/0245266 A1 | 8/2017 | Yang et al. | |
| 2018/0310281 A1 | 10/2018 | Takeda et al. | |

* cited by examiner

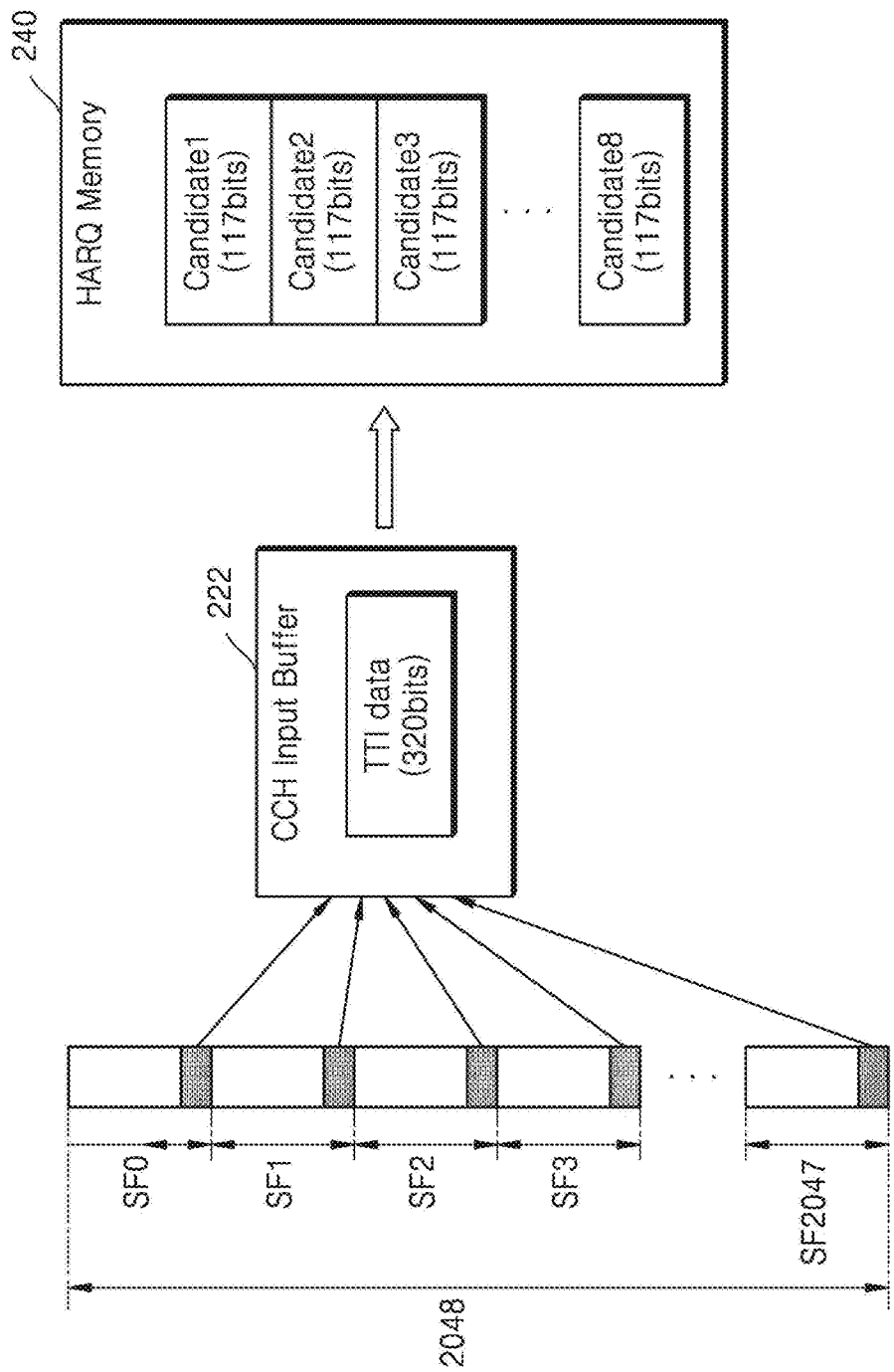

MODEM CHIPS AND RECEIVERS FOR PERFORMING HYBRID AUTOMATIC REPEAT REQUEST PROCESSING

CROSS-REFERENCE TO RELATED APPLICATIONS

The present application is a continuation of and claims priority under 35 U.S.C. § 120 to U.S. patent application Ser. No. 16/227,907, filed on Dec. 20, 2018, which claims priority under Korean Patent Application Nos. 10-2017-0177490 and 10-2018-0127702 filed on Dec. 21, 2017 and Oct. 24, 2018, respectively, in the Korean Intellectual Property Office, the entire contents of each of which are hereby incorporated by reference.

BACKGROUND

The inventive concepts relate to wireless communication devices, and more particularly, to modem chips for reducing errors in data repeatedly transmitted based on a hybrid automatic repeat request (HARQ), receivers, and operating methods of each of the modem chips and the receivers.

HARQ is a transmission manner which adds channel coding using an error packet to an automatic repeat request (ARQ) to reduce time delays of an upper layer and is applied to various mobile communication standards such as high speed packet access (HSPA) and long term evolution (LTE). A data channel is repeatedly transmitted based on HARQ, and an HARQ combination is performed on the repeatedly transmitted data channel.

SUMMARY

The inventive concepts provide modem chips for processing data repeatedly transmitted based on hybrid automatic repeat request (HARQ) combination of each of a data channel and a control channel, receivers, and operating methods of each of the modem chips and the receivers.

According to an aspect of the inventive concepts, there is provided a modem chip for supporting combination of data repeatedly transmitted based on hybrid automatic repeat request (HARQ), the modem chip including an HARQ combiner configured to perform a HARQ combination by combining retransmitted data with the previous HARQ data, the retransmitted data including retransmitted control channel data received via a control channel and retransmitted data channel data received via a data channel, the previous HARQ data corresponding to data received via the control channel and the data channel, the HARQ combination generating updated HARQ data, a memory configured to store the previous HARQ data and the updated HARQ data, and a memory controller configured to control transmission of the previous HARQ data and the updated HARQ data between the HARQ combiner and the HARQ memory.

According to another aspect of the inventive concepts, there is provided a modem chip including a hybrid automatic repeat request (HARQ) combiner configured to perform a HARQ combination to generate HARQ data, the HARQ combination being based on, control channel data repeatedly received through a first plurality of sub-frames, and data channel data repeatedly received through a second plurality of sub-frames different from the first plurality of sub-frames and an HARQ mover configured to store the HARQ data in the external memory or fetch the HARQ data from the external memory through a bus interface.

According to another aspect of the inventive concepts, there is provided a receiver including a hybrid automatic repeat request (HARQ) combiner configured to combine received first data with previously received second data to generate first HARQ data, the first data and the second data being associated with a shared channel, and combine received third data and previously received fourth data to generate second HARQ data, the third data and the fourth data being associated with a downlink control channel, an memory comprising a plurality of storage areas and an HARQ controller configured to store the first HARQ data in a first storage area of the memory, and store the second HARQ data in a second storage area of the memory.

BRIEF DESCRIPTION OF THE DRAWINGS

Some example embodiments of the inventive concepts will be more clearly understood from the following detailed description taken in conjunction with the accompanying drawings in which:

FIGS. 9A and 9B are diagrams illustrating a configuration of a storage area for storing repeatedly transmitted control channel (CCH) data in a decoding block according to some example embodiments and a decoding block according to a comparative example;

DETAILED DESCRIPTION

Hereinafter, some example embodiments will be described with reference to the accompanying drawings.

In describing some example embodiments in detail, a $3^{rd}$ generation partnership project long term evolution (3GPP LTE) communication-based system (particularly, a wireless communication system based on a standard such as Internet of Things (IoT)-oriented enhanced machine type communication (eMTC) or narrowband IoT (NB-IoT)) will be described. However, some example embodiments may be applied to another communication system having a similar technical background and a similar channel type.

Figure 1:
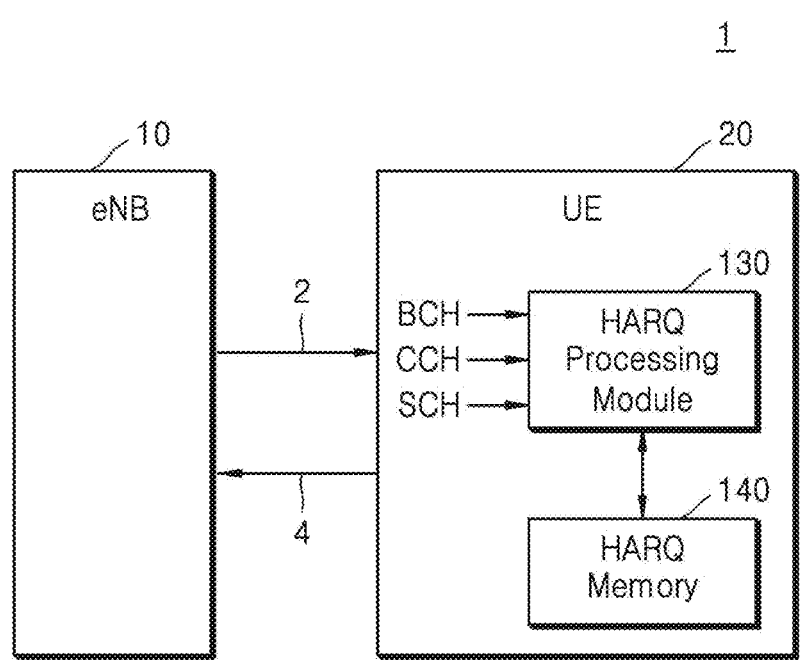
FIG. 1 is a block diagram illustrating a wireless communication system according to some example embodiments.

FIG. 1 is a block diagram illustrating a wireless communication system 1 according to some example embodiments. Referring to FIG. 1, the wireless communication system 1 may include a base station 10 and a terminal 20. The terminal 20 may be located in cell coverage of the base station 10. The base station 10 and the terminal 20 may communicate with each other through a downlink channel 2 and an uplink channel 4. When communication is performed through the downlink channel 2, the base station 10 and the terminal 20 may correspond to a wireless transmitter and a wireless receiver, respectively, and when communication is performed through the uplink channel 4, the base station 10 and the terminal 20 may correspond to a wireless receiver and a wireless transmitter, respectively.

The base station 10 may be referred to as a fixed station which communicates with the terminal 20 and/or another base station and may transmit and/or receive data and/or control information in communication with the terminal 20 and/or another base station. For example, the base station 10 may be referred to as a node B, an evolved-node B (eNB), a base transceiver system (BTS), and/or an access point (AP). Also, the terminal 20 may be a wireless communication device that may transmit and/or receive data and/or control information in communication with the base station 10. For example, the terminal 20 may be referred to as user equipment (UE), a mobile station (MS), a mobile terminal (MT), a user terminal (UT), a subscriber station (SS), a wireless device, and/or a portable device.

A wireless communication network between the base station 10 and the terminal 20 may share available network resources to support communication between a plurality of users. For example, in the wireless communication network, information may be transferred based on various manners such as code division multiple access (CDMA), frequency division multiple access (FDMA), time division multiple access (TDMA), orthogonal frequency division multiple access (OFDMA), single carrier frequency division multiple access (SC-FDMA), sparse code multiple access (SCMA), resource spread multiple access (RSMA), and/or pattern division multiple access (PDMA).

Each of the elements (e.g., a HARQ processing module 130 discussed further below) included in the base station 10 and the terminal 20 may be a hardware block including an analog circuit and/or a digital circuit, or may be a software block including a plurality of commands which are executed by at least one processor and the like.

In wireless communication, due to various causes such as a movement of the terminal 20 and signal interference between the base station 10 and another base station, a channel environment (for example, a signal to noise ratio (SNR), a fading state, etc.) may be variable, and when the channel environment is defective, a communication error may occur. In order to mitigate the communication error, the base station 10 may repeatedly transmit data (e.g., a data packet), and the terminal 20 may perform decoding (e.g., channel decoding), based on the repeatedly transmitted data.

In various mobile communication standards such as LTE or high speed packet access (HSPA), a hybrid automatic repeat request (HARQ) function may be applied. For example, in an HARQ operation based on soft combining, when an error occurs in previously transmitted data, previous data (for example, HARQ data) may be stored. Next, combined data may be generated through a HARQ combination (for example, may be referred to as a retransmission combination or an HARQ retransmission combination) using retransmitted data and the HARQ data. In this case, as the amount of information combined through the HARQ combination increases, the reliability of the combined data increases to a level higher than that of the initially transmitted data and/or retransmitted data. An error detection operation of determining whether to retransmit data may use a cyclical redundancy check (CRC) code, but some example embodiments are not limited thereto. That is, error detection based on various manners may be applied.

The base station 10 may repeatedly transmit control channels (e.g., the base station 10 may repeatedly transmit control information over respective control channels) (for example, a broadcast channel (BCH) and a downlink control channel (CCH)) for communication, and a shared channel (SCH) (e.g., a data channel including user data to be provided to the terminal 20). For example, the SCH may be referred to as a physical downlink shared channel (PDSCH), the BCH may be referred to as a physical broadcast channel (PBCH), and the CCH may be referred to as a physical downlink control channel (PDCCH).

The base station 10 may repeatedly transmit data in response to a request (or feedback information) from the terminal 20. When the wireless communication system 1 is an IoT network system, the number of repetitive transmissions may be previously set for controlling a communication error caused by a defective channel environment, and the base station 10 may repeatedly transmit the same data during a plurality of determined sub-frames.

The terminal 20 may receive sub-frames transmitted from the base station 10 and may transmit, through the uplink channel 4, feedback information and a response to the downlink channel 2 (e.g., a response to the sub-frames received over the downlink channel 2). The terminal 20 may decode data included in each of the sub-frames. When decoding fails, (for example, when a CRC error occurs) the terminal 20 may combine repeatedly transmitted data (e.g., data of a sub-frame received subsequently) with previously received data (e.g., HARQ data) and may again perform decoding, based on combined data. As the amount of information increases, the reliability of the combined data increases to a level higher than that before the combination, thereby increasing the probability of successfully decoding the sub-frame (e.g., a decoding success probability).

The terminal 20 may include an HARQ processing module 130 for combining repeatedly transmitted data and an HARQ memory 140 for storing combined data. The HARQ processing module 130 may combine received data with previously received data. The HARQ processing module 130 may perform an HARQ combination. The HARQ combination may be a soft combination, and for example, may include chase combining. According to some example embodiments, operations described herein as being performed by the HARQ processing module 130 may be performed by at least one processor executing program code that includes instructions corresponding to the operations. The instructions may be stored in a memory of the terminal 20 (e.g., the HARQ memory 140). The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multi-processor, an application-specific integrated circuit (ASIC), and a field programmable gate array (FPGA). According to some example embodiments, operations described as being performed by the HARQ processing module 130 may be performed by circuitry. For example, the circuitry may include an application-specific integrated circuit (ASIC) or a field programmable gate array (FPGA).

Moreover, when decoding based on combined data fails, the HARQ processing module 130 may store the combined data in the HARQ memory 140 so as to combine the combined data with subsequently received data, or when received data is initially transmitted data, the HARQ processing module 130 may store the received data in the HARQ memory 140 so as to combine the received data with subsequently received data. In conventional LTE communication, a link control channel is not repeatedly transmitted. However, the Internet of Things (IoT)-oriented LTE communication standard includes the repetitive transmission of the link control channel. It would be desirable to develop technology for efficiently processing repeatedly transmitted data of a control channel, including a broadcast channel and the link control channel, in addition to a data channel.

In some example embodiments, the HARQ processing module 130 may combine SCH data, combine BCH data, and/or combine CCH data. That is, an HARQ combination may be applied to an SCH, a BCH, and/or a CCH, respectively. The HARQ processing module 130 may store combined data (for example, HARQ data), obtained through a combination performed on each of the SCH, the BCH, and/or the CCH, in the HARQ memory 140. In this manner, in the terminal 20 according to some example embodiments, repeatedly transmitted control channels (for example, the BCH and/or the CCH) may be combined in an HARQ combination, and a data channel (for example, the SCH) and the control channels may share the HARQ processing module 130 and the HARQ memory 140. Accordingly, an area of a circuit used for processing the data channel and the control channels may decrease, and memory use efficiency may increase.

Figure 2A:
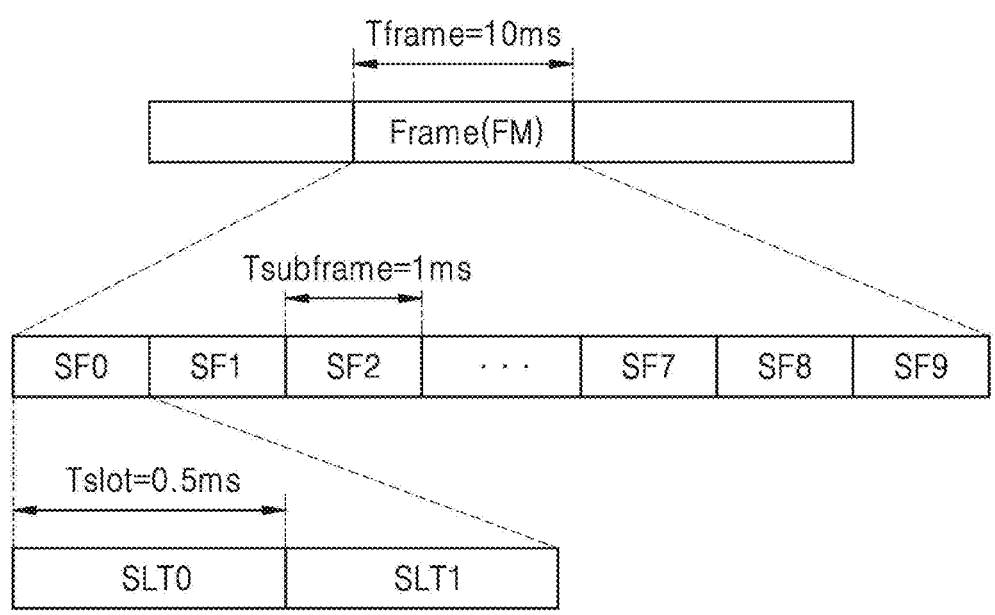
FIG. 2A is a diagram illustrating an example of a frame structure of a downlink signal.
Figure 2B:
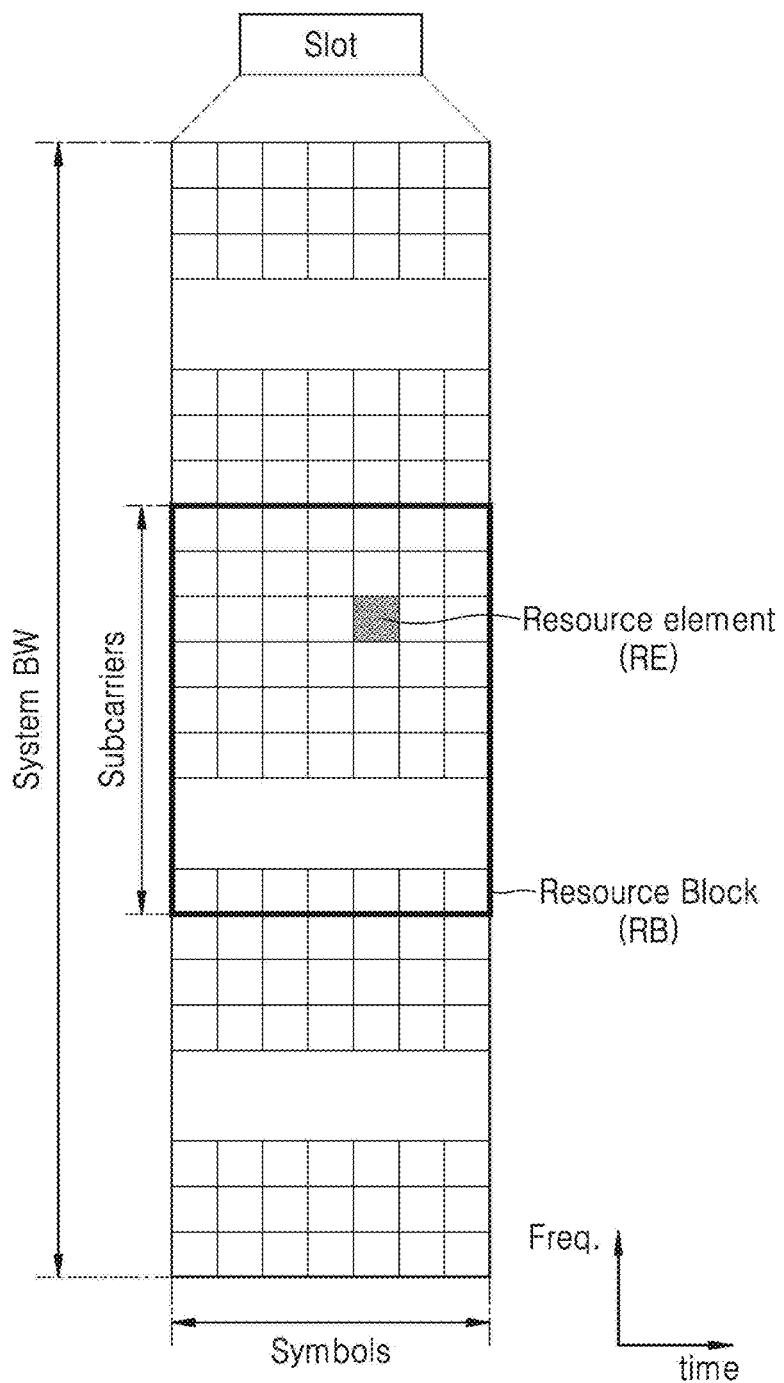
FIG. 2B is a diagram illustrating a resource structure of a slot.

FIG. 2A is a diagram illustrating an example of a frame structure of a downlink signal. FIG. 2B is a diagram illustrating a resource structure of a slot. In FIG. 2A, the abscissa axis represents a time domain, and the ordinate axis represents a frequency domain.

Referring to FIG. 2A, a terminal (e.g., the terminal 20 of FIG. 1) may receive a plurality of frames through a downlink channel (e.g., the downlink channel 2 of FIG. 1), and one frame FM may include ten sub-frames SF0 to SF9. The terminal 20 may sequentially receive the sub-frames SF0 to SF9. One sub-frame may include two slots. For example, the duration of one frame FM may be 10 ms, the duration of one sub-frame may be 1 ms, and the duration of one slot may be 0.5 ms. A time taken in transmitting one sub-frame may be referred to as a transmission time interval (TTI). However, some example embodiments are not limited thereto, and a structure of a wireless frame and the TTI may be changed based on a communication system.

Referring to FIG. 2B, a slot may include a plurality of resource blocks RB on a frequency axis. A system transmission band may include a plurality of narrow bands, and the plurality of resource blocks RB may be respectively transmitted through the plurality of narrow bands. Each of the resource blocks RB may include a plurality of symbols in the time domain and may include a plurality of subcarriers in the frequency domain. A symbol may be a minimum unit of transmission in the time domain, and a subcarrier may be a minimum unit of transmission in the frequency domain. A minimum unit of data transmission may be a resource block RB, and a data rate may increase in proportion to a resource block RB scheduled in a terminal. A basic unit of resource in a time-frequency domain may be a resource element and may be represented as a symbol index and a subcarrier index. Data channel and control channels may correspond to resource elements RE. Each of the plurality of resource blocks RB may include reference signals RS transmitted through channel estimation and/or equalization, in addition to a resource element RE.

Figure 3A:
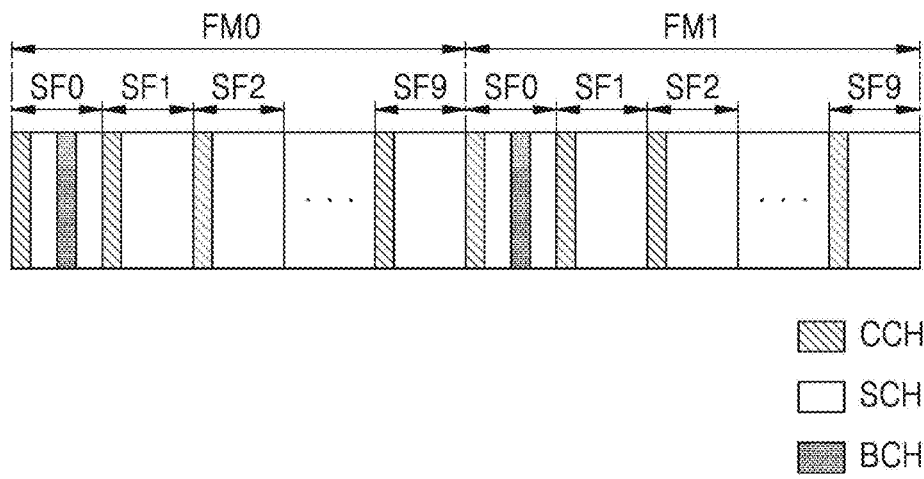
FIGS. 3A and 3B are diagrams exemplarily illustrating a frame structure including a data channel and control channels in a long term evolution (LTE)-based communication system.
Figure 3B:
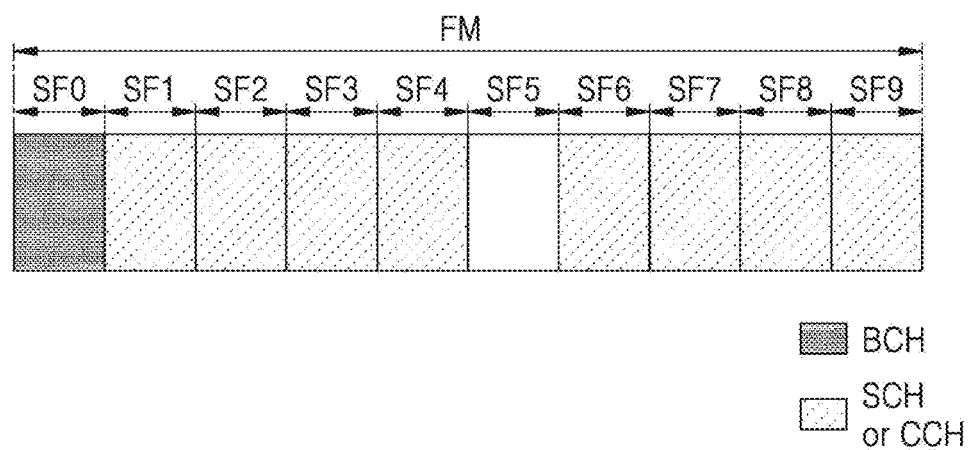

FIGS. 3A and 3B are diagrams exemplarily illustrating a frame structure including a data channel and control channels in a long term evolution (LTE)-based communication system.

FIG. 3A illustrates an example of a frame structure in a general LTE communication system. Referring to FIG. 3A, an CCH may be allocated to some initial symbols of each sub-frame SF, and a BCH and/or an SCH may be allocated to the other symbols. BCH data may be transmitted through one sub-frame (for example, a first sub-frame SF0) of one frame FM and may be repeatedly transmitted every four frames (for example, the BCH in a sub-frame of every four frames may contain same data. SCH data may be transmitted in each frame and sub-frame and may be repeatedly transmitted until decoding succeeds or during a determined number of sub-frames (for example, the SCH in a determined number of sub-frames may contain same data). In the frame structure of FIG. 3A, CCH data may not repeatedly be transmitted (for example, the CCH in each sub-frame may contain different data) according to a communication protocol for the general LTE communication system. The terminal 20 performs wireless communication based on the communication protocol.

When data (e.g., at least one of the BCH data or the SCH data) is retransmitted through a sub-frame, HARQ combining may be performed on the retransmitted data in a period for the sub-frame. Some example embodiments, when BCH data and SCH data are retransmitted through a sub-frame (for example, the first sub-frame SF0 of the second frame FM1), a first HARQ combining on a retransmitted BCH data is performed and then a second HARQ combining on a retransmitted BCH data is performed during a period in which the sub-frame is received or processed.

FIG. 3B illustrates an example of a frame structure in an IoT-oriented LTE communication system. Referring to FIG. 3B, one of a data channel and control channels may be received in each sub-frame. An BCH may be received in a first sub-frame SF0 of a frame FM, and an SCH or a CCH may be received in second to fifth sub-frames SF1 to SF4 and seventh to tenth sub-frames SF6 to SF9.

BCH data and SCH data may be repeatedly transmitted, and CCH data also may be repeatedly transmitted through a plurality of sub-frames, according to a communication protocol for the IoT-oriented LTE communication system.

When data (e.g., one of the BCH data, the CCH data and the SCH data) is retransmitted through a sub-frame, HARQ combining may be performed on the retransmitted data in a period for the sub-frame. For example, in FIG. 3b, when CCH data is retransmitted through a second sub-frame SF1 and the SCH data is retransmitted through the third sub-frame SF2, a first HARQ combining on a retransmitted CCH data is performed during a period for the second sub-frame SF1, in which the retransmitted CCH data is received or processed, and a second HARQ combining on a retransmitted SCH data is performed during a period for the third sub-frame SF2, in which the retransmitted SCH data is received or processed.

Figure 4:
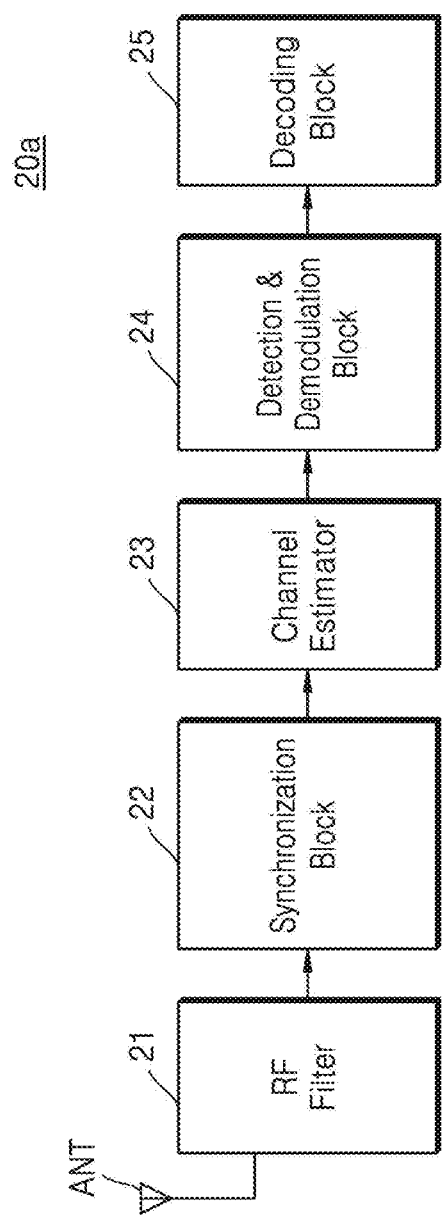
FIG. 4 is a block diagram illustrating a configuration of a receiver in a wireless communication system according to some example embodiments.

FIG. 4 is a block diagram illustrating a configuration of a receiver 20a in a wireless communication system according to some example embodiments. The receiver 20a may be included in a terminal (e.g., the terminal 20) when receiving a downlink signal (e.g., the downlink channel 2) and/or may be included in a base station (e.g., the base station 10) in when receiving an uplink signal (e.g., the uplink channel 4).

Referring to FIG. 4, the receiver 20a may include a radio frequency (RF) filter 21, a synchronization block 22, a channel estimator 23, a detection/demodulation block 24, and a decoding block 25. In some example embodiments, the synchronization block 22, the channel estimator 23, the detection/demodulation block 24, and the decoding block 25 may be included in a communication chip or an application processor. The synchronization block 22, the channel estimator 23, the detection/demodulation block 24, and the decoding block 25 may be integrated into one semiconductor chip. According to some example embodiments, operations described herein as being performed by any or all of the radio frequency (RF) filter 21, the synchronization block 22, the channel estimator 23, the detection/demodulation block 24, and/or the decoding block 25 may be performed by at least one processor executing program code that includes instructions corresponding to the operations. The instructions may be stored in a memory of the terminal 20 and/or the base station 10 (e.g., the HARQ memory 140). According to some example embodiments, operations described as being performed by any or all of the radio frequency (RF) filter 21, the synchronization block 22, the channel estimator 23, the detection/demodulation block 24, and/or the decoding block 25 may be performed by circuitry. For example, the circuitry may include an application-specific integrated circuit (ASIC) or a field programmable gate array (FPGA).

The RF filter 21 may pass only signals of frequencies capable of being processed by the receiver 20a among downlink signals received through an antenna ANT. The RF filter 21 may convert an RF signal into a baseband digital signal.

In a case where a terminal initially accesses a cell so as to perform a cell reselection or handover from a currently-accessed cell to another cell, the synchronization block 22 may perform cell search by using a synchronization signal (for example, a primary synchronous signal (PSS) and a secondary synchronous signal (SSS)) included in a filtered downlink signal, and the synchronization block 22 may perform the cell search by using the synchronization signal to obtain a symbol synchronization and a frequency of a cell. The synchronization block 22 may obtain a downlink frame synchronization of a cell and may determine a cell identification (ID).

The channel estimator 23 may perform channel estimation on a sub-frame. The channel estimator 23 may generate channel values of resource elements mapped to reference signals and may perform channel estimation on a target resource element by using the channel values.

The detection/demodulation block 24 may detect a data signal through a downlink channel estimating operation and may demodulate a detected value. An operation of detecting the data signal may include an operation of obtaining an estimation data signal by using an estimated channel value corresponding to a resource element mapped to the data signal. For example, the detection/demodulation block 24 may demodulate the data signal using conventional modulation methods to output a log-likelihood ratio (LLR) of each coded bit, and in this case, a coded bit may be a bit "0" or "1".

The decoding block 25 may decode demodulated data to obtain a data signal sent from a transmitter to the receiver 20a. The decoding block 25 may include an HARQ processing module (130 of FIG. 1) and an HARQ memory (140 of FIG. 1), each described above with reference to FIG. 1, and may combine repeatedly transmitted data of each of a BCH, a CCH, and/or an SCH by using an HARQ manner. A configuration and an operation of the decoding block 25 will be described in detail below with reference to FIGS. 5 through 15.

The receiver 20a of the terminal according to some example embodiments has been described above with reference to FIG. 4. However, some example embodiments are not limited to the configuration of the receiver 20a illustrated in FIG. 4. The receiver 20a may have various configurations based on various communication protocols.

Figure 5:
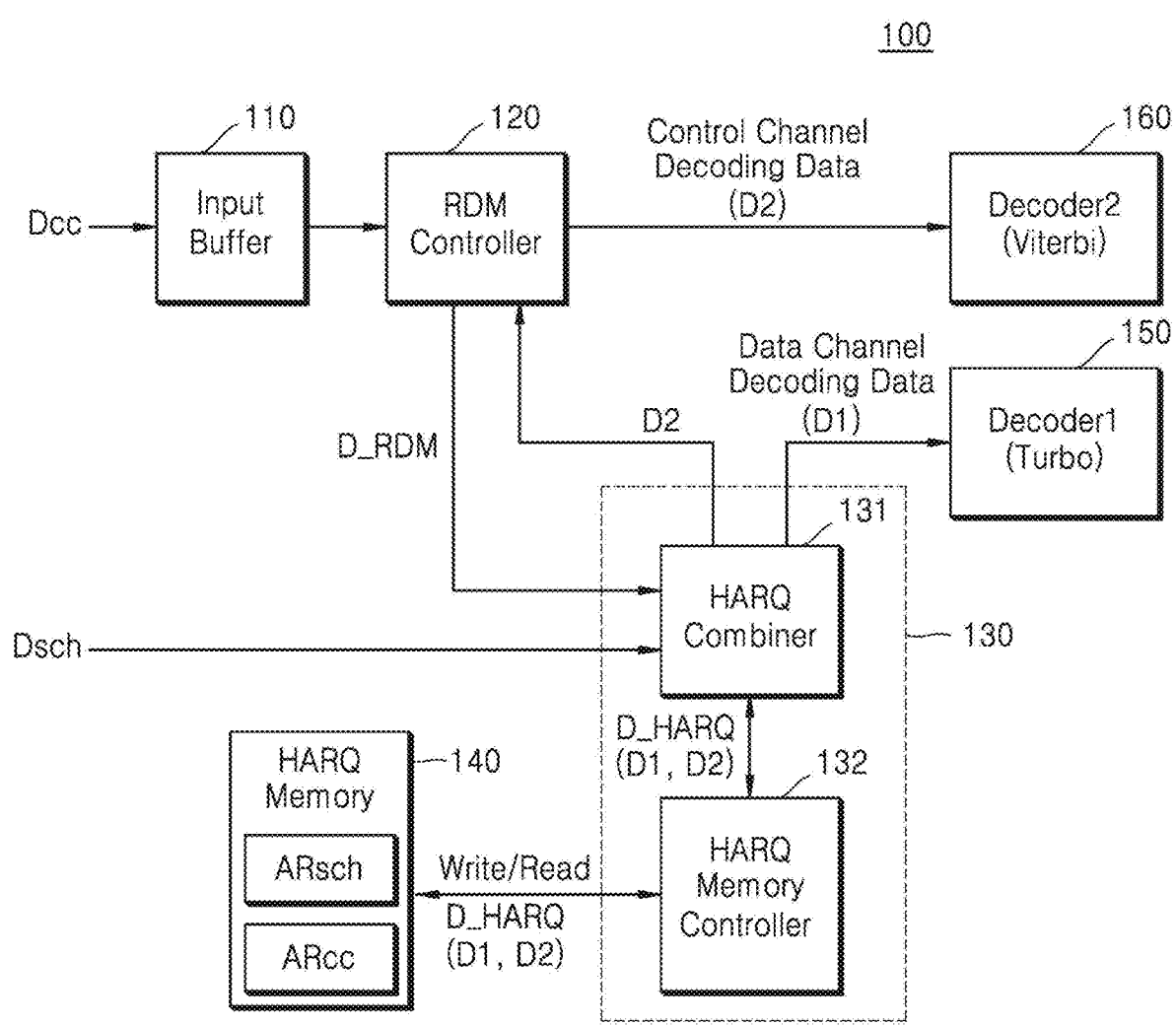
FIG. 5 is a block diagram illustrating a decoding block according to some example embodiments.

FIG. 5 is a block diagram illustrating a decoding block 100 according to some example embodiments.

Referring to FIG. 5, the decoding block 100 may include an input buffer 110, a rate de-matching (RDM) controller 120, an HARQ processing module 130, an HARQ memory 140, a first decoder 150, and a second decoder 160. The HARQ processing module 130 may include an HARQ combiner 131 and an HARQ memory controller 132. Each of the elements of the decoding block 100 illustrated in FIG. 5 (e.g., the input buffer 110, the RDM controller 120, the HARQ processing module 130, the HARQ combiner 131, the HARQ memory controller 132, the first decoder 150, and/or the second decoder 160) may be implemented as (e.g., the operations described herein as being performed thereby may be performed using) hardware which performs a function thereof in hardware (e.g., circuitry such as an ASIC or FPGA), or may be implemented as software executed by at least one central processing unit (CPU) of the decoding block 100 or a communication chip (for example, a modem chip) equipped with the decoding block 100. Alternatively, each of the elements of the decoding block 100 may be implemented by a combination of hardware and software.

Demodulated data (hereinafter referred to as control channel data) Dcc of a control channel from a detection/demodulation block (e.g., the detection/demodulation block 24 of FIG. 4) and demodulated data (hereinafter referred to as shared channel data) Dsch of a data channel (e.g., a shared channel) may be received. The control channel data Dcc may include at least one of BCH data or CCH data.

The input buffer 110 may receive the control channel data Dcc and may store the control channel data Dcc for rate de-matching. The input buffer 110 may store the control channel data Dcc received through one sub-frame and may include a storage capacity corresponding to the number of bits of the control channel data Dcc. The input buffer 110 may update stored data (e.g., delete previously stored data), based on the control channel data Dcc received whenever the control channel data Dcc is repeatedly transmitted.

The RDM controller 120 may perform rate de-matching on the control channel data Dcc. A transmitter (for example, a base station) may perform rate matching for repeatedly adding control channel data, which is to be transmitted, and may transmit rate matched control channel data through a sub-frame. For example, the rate matched control channel data may include bits which are three times more than the number of bits of real data. The RDM controller 120 may perform rate de-matching, based on self-combining of data bits. Rate de-matched data D_RDM of a control channel may be transmitted to the HARQ processing module 130 or second decoder 160. In some example embodiments, the rate de-matched data D_RDM based on a initially transmitted control channel data (Dcc) may be transmitted to the second decoder 160 as a control channel decoding data, and transmitted to the HARQ processing module 130 to be stored in the HARQ memory 140. The rate de-matched data D_RDM based on a retransmitted control channel data (Dcc) may be transmitted to the HARQ processing module 130 for HARQ combining.

The HARQ processing module 130 may include the HARQ combiner 131 and the HARQ memory controller 132. The HARQ combiner 131 may perform an HARQ combination on repeatedly transmitted data to generate HARQ data D_HARQ. The HARQ memory controller 132 may control transmission of the HARQ data D_HARQ so that the HARQ data D_HARQ is stored in an internal HARQ memory 140 or an external memory (a memory which transmits and/or receives data through a bus shared by a modem chip into which the decoding block 100 is integrated).

The HARQ combiner 131 may perform an HARQ combination on retransmitted shared channel data Dsch and previously received data (for example, previous HARQ data D_HARQ of the shared channel data Dsch) to generate HARQ data (e.g., first HARQ data D1) corresponding to the shared channel data Dsch. Also, the HARQ combiner 131 may perform an HARQ combination on the retransmitted control channel data Dcc (e.g., retransmitted and rate de-matched control channel data) and previously received data (e.g., previous HARQ data of the control channel data Dcc) to generate HARQ data (e.g., second HARQ data D2) corresponding to the control channel data Dcc. In some example embodiments, the HARQ combiner 131 may perform an HARQ combination, based on chase combining methods.

The HARQ memory controller 132 may control an operation of writing (e.g., storing) and/or reading data in and/or from the HARQ memory 140. The HARQ memory controller 132 may write HARQ data (e.g., the first HARQ data D1 and the second HARQ data D2), provided from the HARQ combiner 131, in the HARQ memory 140. Subsequently, when the HARQ combiner 131 performs an HARQ combination on retransmitted data (for example, retransmitted control channel data Dcc and/or retransmitted shared channel data Dsch), the HARQ memory controller 132 may read stored HARQ data D_HARQ from the HARQ memory 140 and may provide the read HARQ data D_HARQ as previous HARQ data to the HARQ combiner 131.

The HARQ memory 140 may be a memory embedded into a modem chip with the decoding block 100 integrated thereinto or another area of the memory. The HARQ memory 140 may be implemented as a non-volatile memory such as static random access memory (SRAM) or dynamic random access memory (DRAM). The HARQ memory 140 may include a shared channel storage area ARsch and a control channel storage area ARcc. For example, the shared channel storage area ARsch may be an area which is allocated for storing the shared channel data Dsch, and the control channel storage area ARcc may be an area which is allocated for storing the control channel data Dcc.

The HARQ memory controller 132 may write (e.g., store) the first HARQ data D1 of the shared channel data Dsch in the shared channel storage area ARsch and may write the second HARQ data D2 of the control channel data Dcc in the control channel storage area ARcc. Also, when the HARQ combiner 131 performs an HARQ combination on retransmitted shared channel data Dsch, the HARQ memory controller 132 may read stored first HARQ data D1 from the shared channel storage area ARsch of the HARQ memory 140 and may provide the first HARQ data D1 as previous HARQ data to the HARQ combiner 131. When the HARQ combiner 131 performs an HARQ combination on retransmitted control channel data Dcc, the HARQ memory controller 132 may read stored second HARQ data D2 from the control channel storage area ARcc of the HARQ memory 140 and may provide the second HARQ data D2 as previous HARQ data to the HARQ combiner 131.

The HARQ combiner 131 may provide the first HARQ data D1 as data channel decoding data to the first decoder 150 and may provide the second HARQ data D2 as control channel decoding data to the second decoder 160. The HARQ combiner 131 may transmit the second HARQ data D2 to the second decoder 160 through the RDM controller 120. However, some example embodiments are not limited thereto, and the HARQ combiner 131 may transmit the second HARQ data D2 directly to the second decoder 160. In some example embodiments, the first HARQ data D1 may be de-interleaved by a de-interleaver before being provided to the first decoder 150. The first decoder 150 may perform shared channel decoding based on the first HARQ data D1, and the second decoder 160 may perform control channel decoding based on the second HARQ data D2. In some example embodiments, the first decoder 150 and the second decoder 160 may perform decoding according to different decoding techniques. For example, the first decoder 150 may be a turbo decoder which performs decoding according to a turbo algorithm, and the second decoder 160 may be a Viterbi decoder which performs decoding according to a list Viterbi algorithm.

Decoding of the control channel data Dcc (e.g., control channel decoding based on the second HARQ data D2) may be performed prior to decoding of the shared channel data Dsch (e.g., data channel decoding based on the first HARQ data D1). When decoding of the control channel data Dcc succeeds and a receiver obtains control information about communication, decoding of the shared channel data Dsch may be performed based on the control information. Therefore, as in the frame structure of FIG. 3A, when the control channel data Dcc and the shared channel data Dsch are contemporaneously received in one TTI (for example, the same sub-frame), the HARQ processing module 130 may perform an HARQ combination on rate de-matched data D_RDM of the received control channel data Dcc, and then, may perform an HARQ combination on the shared channel data Dsch. According to some example embodiments, when the control channel data Dcc and the shared channel data Dsch are received through the same sub-frame, the HARQ combination is performed on the control channel data Dcc during a period in which the sub-frame is received (e.g., the TTI of the sub-frame), and the HARQ combination is performed on the shared channel data Dsch during the period in which the sub-frame is received. According to some example embodiments, when the control channel data Dcc and the shared channel data Dsch are received through different sub-frames (e.g., as in the frame structure of FIG. 3B), the HARQ combination is performed on the control channel data Dcc during a first sub-frame period (e.g., the TTI) in which the control channel data Dcc is received, and the HARQ combination is performed on the shared channel data Dsch during a second sub-frame period (e.g., the TTI) in which the shared channel data Dsch is received.

As described above with reference to FIG. 5, in the decoding block 100 according to some example embodiments, the HARQ processing module 130 may perform an HARQ combination on repeatedly received control channel data Dcc as well as repeatedly received shared channel data Dsch and may store HARQ data D_HARQ, generated through the HARQ combination, in the HARQ memory 140. In other words, a control channel and a shared channel (e.g., a data channel) may share the HARQ processing module 130 and the HARQ memory 140. Therefore, a separate logic for combining repeatedly received control channel data Dcc may be omitted, and a storage area for storing repeatedly received control channel data Dcc may be minimized or reduced. Accordingly, an area of the decoding block 100 may decrease, and memory use efficiency may increase.

Figure 6:
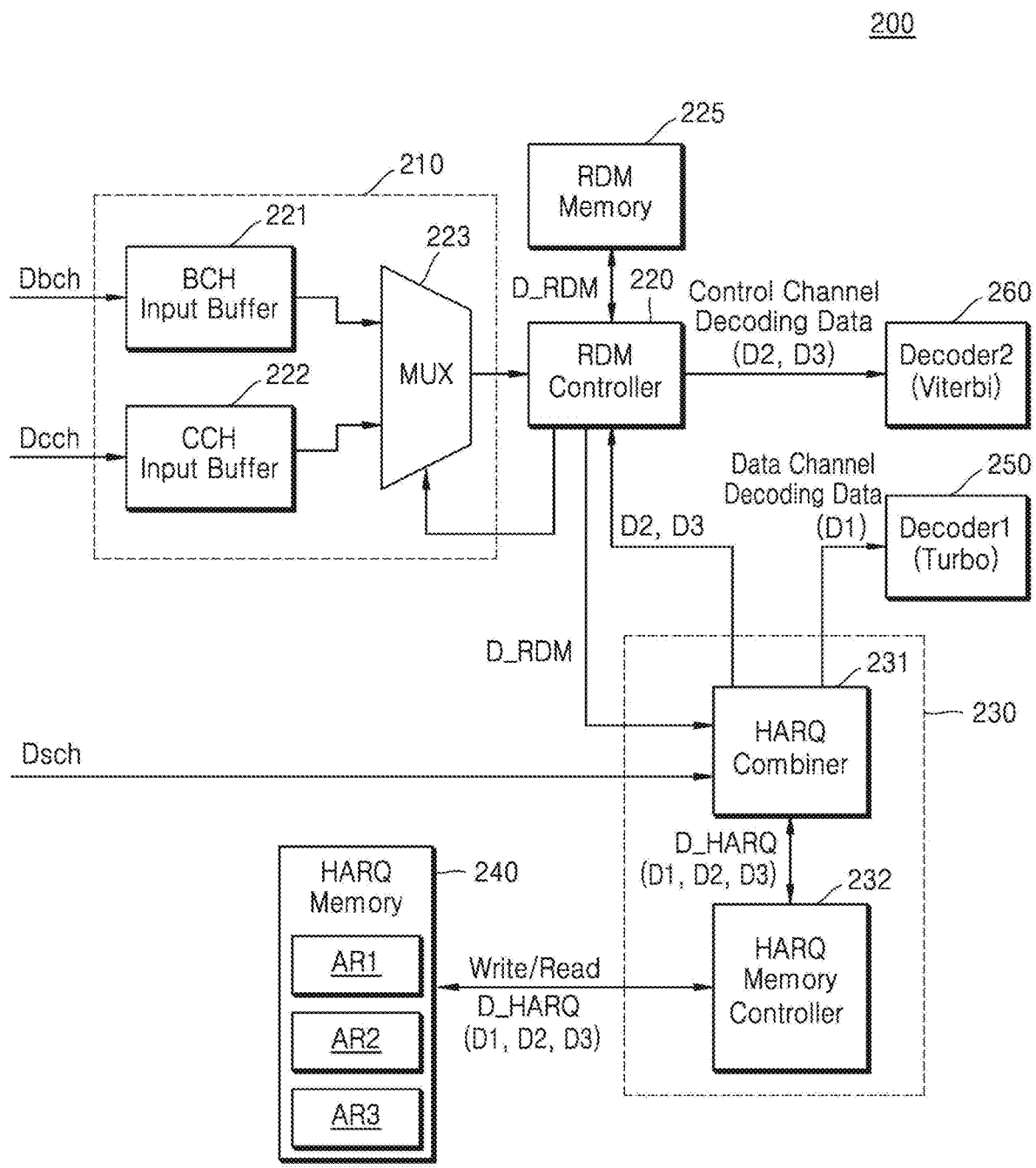
FIGS. 6 and 7 are block diagrams illustrating a decoding block for receiving a plurality of control channels according to some example embodiments.
Figure 7:
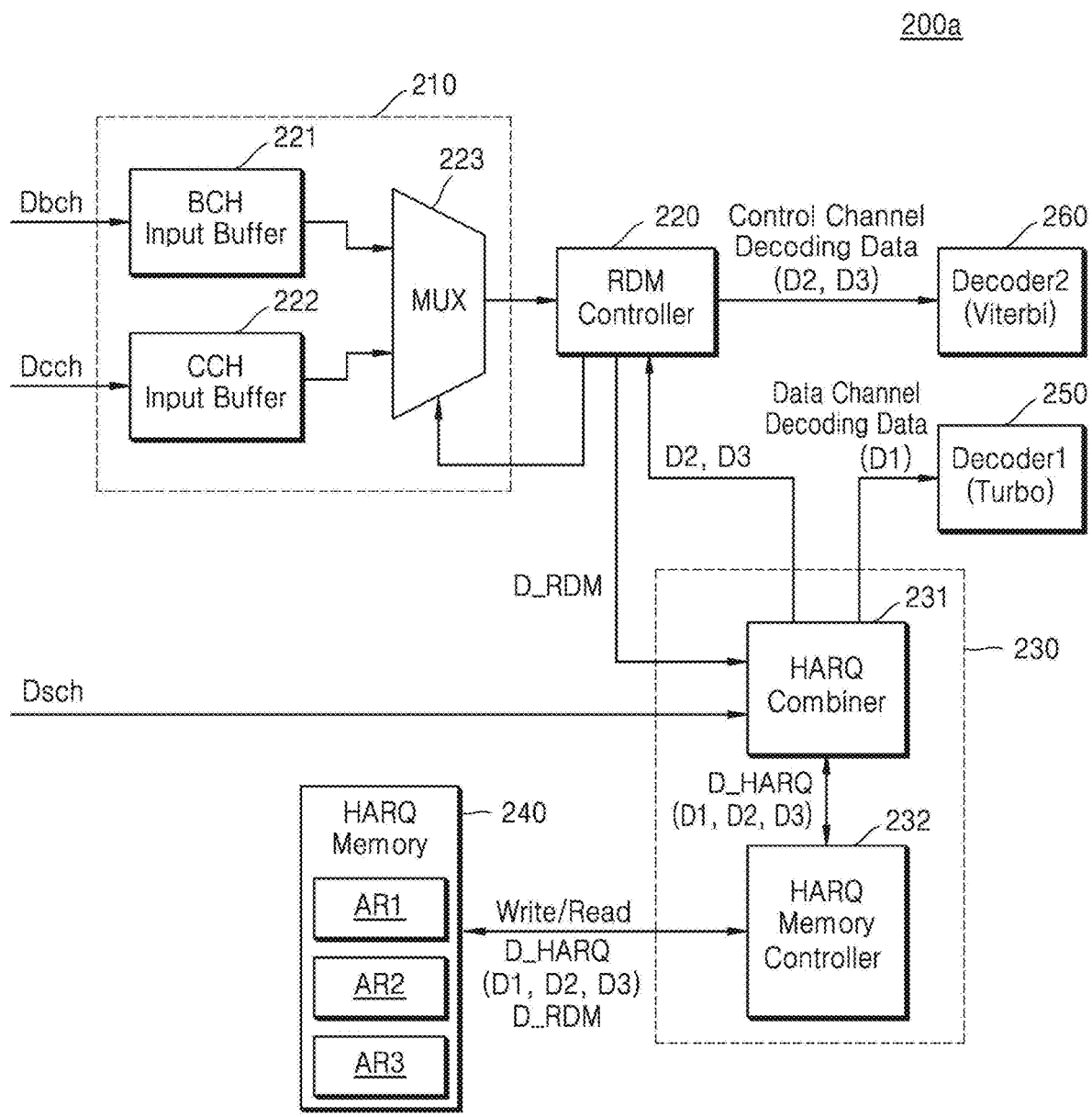

FIGS. 6 and 7 are block diagrams illustrating a decoding block for receiving a plurality of control channels according to some example embodiments. FIGS. 6 and 7 illustrate in more detail an implementation example of the decoding block 100 of FIG. 5. A decoding block 200 of FIG. 6 may be applied to various LTE communication systems, and a decoding block 200a of FIG. 7 may be applied to various IoT-oriented LTE communication systems.

Referring to FIG. 6, the decoding block 200 may include a control channel input block 210, an RDM controller 220, a multiplexer 223, an HARQ processing module 230, an HARQ memory 240, a first decoder 250, and a second decoder 260. According to some example embodiments, operations described herein as being performed by any or all of the control channel input block 210, the RDM controller 220, the multiplexer 223, the HARQ processing module 230, the first decoder 250, and/or the second decoder 260 may be performed by at least one processor executing program code that includes instructions corresponding to the operations. The instructions may be stored in a memory of the terminal 20 and/or the base station 10 (e.g., the HARQ memory 140). According to some example embodiments, operations described as being performed by any or all of the control channel input block 210, the RDM controller 220, the multiplexer 223, the HARQ processing module 230, the first decoder 250, and/or the second decoder 260 may be performed by circuitry. For example, the circuitry may include ASIC or a FPGA.

Shared channel data (hereinafter referred to as SCH data) Dsch may be received, and CCH data Dcch and BCH data Dbch may be received as control channel data. The control channel input block 210 may include a BCH input buffer 221, a CCH input buffer 222, and a multiplexer 223 for receiving and processing the CCH data Dcch and the BCH data Dbch. The CCH data Dcch and the BCH data Dbch may be respectively stored in the BCH input buffer 221 and the CCH input buffer 222, for rate de-matching. The multiplexer 223 may selectively provide the BCH data Dbch and the CCH data Dcch to the RDM controller 220 according to control by the RDM controller 220.

The RDM controller 220 may perform rate de-matching on the BCH data Dbch or the CCH data Dcch. For example, as illustrated in FIG. 3A, when the CCH data Dcch and the SCH data Dsch are contemporaneously received in one TTI (for example, one sub-frame), the CCH data Dcch may be decoded before the SCH data Dsch, for use in decoding of the SCH data Dsch. A CCH (for example, a PDCCH) may include downlink control information (DCI), and a plurality of CCHs may be transmitted in one TTI. Each of the CCHs may be transmitted based on an aggregation of control channel elements (CCEs) respectively corresponding to a plurality of resource element groups (REGs), and a CCE set where a CCH is located for each terminal may be defined. A CCE set where a terminal is capable of searching for a CCH thereof may be referred to as a PDCCH search space, and a terminal may perform blind decoding on CCH candidates (e.g., resource elements RE) in a search space. The number of blind decoding operations performed in one TTI may be 60 or more, and thus, rate de-matching of CCH candidates may be contemporaneously performed for fast decoding. Therefore, rate de-matched data D_RDM of the CCH data Dcch may be stored and used in an RDM memory 225 for fast decoding. Rate de-matched data D_RDM of the BCH data Dbch or the CCH data Dcch may be transmitted to the HARQ processing module 130 or the second decoder 260. In some example embodiments, the rate de-matched data D_RDM based on a initially transmitted data may be transmitted to the second decoder 260 as a control channel decoding data, and transmitted to the HARQ processing module 230 to be stored in the HARQ memory 240. The rate de-matched data D_RDM based on a retransmitted data may be transmitted to the HARQ processing module 230 for HARQ combining.

The HARQ processing module 230 may perform an HARQ combination on repeatedly transmitted data of each channel to generate HARQ data D_HARQ and may store the HARQ data D_HARQ in the HARQ memory 240. For example, the HARQ combiner 231 may generate first HARQ data D1 corresponding to repeatedly transmitted SCH data Dsch, generate second HARQ data D2 corresponding to repeatedly transmitted CCH data Dcch, and generate third HARQ data D3 corresponding to repeatedly transmitted BCH data Dbch. The HARQ memory controller 232 may write the first HARQ data D1 in a first storage area AR1 allocated for a shared channel and may write the second HARQ data D2 and the third HARQ data D3 in a second storage area AR2 and a third storage area AR3, respectively, each allocated for a control channel. When an HARQ combination is performed on each of the SCH data Dsch, the CCH data Dcch, and the BCH data Dbch, the HARQ memory controller 232 may read each of the stored first HARQ data D1, second HARQ data D2, and third HARQ data D3 from the HARQ memory 240 and may provide the read data as previous HARQ data to the HARQ combiner 231. The HARQ combiner 231 and the HARQ memory controller 232 of FIGS. 6-7 may be similar to or the same as the HARQ combiner 131 and the HARQ memory controller 132 of FIG. 5. Some example embodiments, when the SCH data Dsch and the BCH data Dbch (and/or the CCH data Dcch) are received through a same sub-frame, the HARQ processing module 230 may perform an HARQ combination on the retransmitted BCH data Dbch (and/or the CCH data Dcch) and then perform an HARQ combination on the retransmitted SCH data during a sub-frame period, in which the sub-frame is received or processed. When the SCH data Dsch and the BCH data Dbch (and/or the CCH data Dcch) are received through different sub-frames, the HARQ processing module 230 may perform an HARQ combination on the retransmitted BCH data Dbch (and/or the CCH data Dcch) during a first sub-frame period in which the sub-frame including the retransmitted BCH data Dbch (and/or the CCH data Dcch) is received or processed, and then perform an HARQ combination on the retransmitted SCH data during a second sub-frame period, in which the sub-frame including the retransmitted SCH data is received or processed.

The HARQ combiner 231 may provide the first HARQ data D1 as data channel decoding data to the first decoder 250 and may provide the second HARQ data D2 and the third HARQ data D3 as control channel decoding data to the second decoder 260. The first decoder 250 may perform SCH decoding based on the first HARQ data D1, and the second decoder 260 may perform CCH decoding based on the second HARQ data D2 and may perform BCH decoding based on the third HARQ data D3.

As described above with reference to FIG. 3B, in the IoT-oriented LTE communication system, only one of a BCH, a CCH, and an SCH may be received in one TTI (for example, a sub-frame), and thus, in decoding the CCH, rate de-matching of PDCCH candidates may not be contemporaneously performed. Accordingly, as illustrated in FIG. 7, the decoding block 200a may not include a separate RDM memory, and rate de-matched data D_RDM may be stored and used in the HARQ memory 240.

Figure 8A:
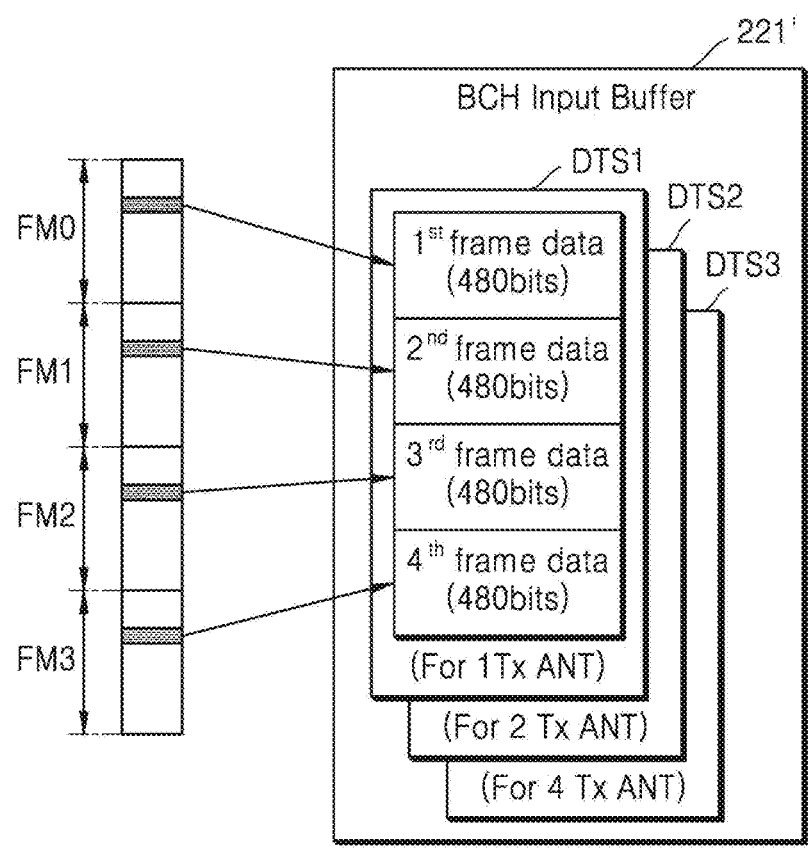
FIGS. 8A and 8B are diagrams illustrating a configuration of a storage area for storing repeatedly transmitted broadcast channel (BCH) data in a decoding block according to some example embodiments and a decoding block according to a comparative example.
Figure 8B:
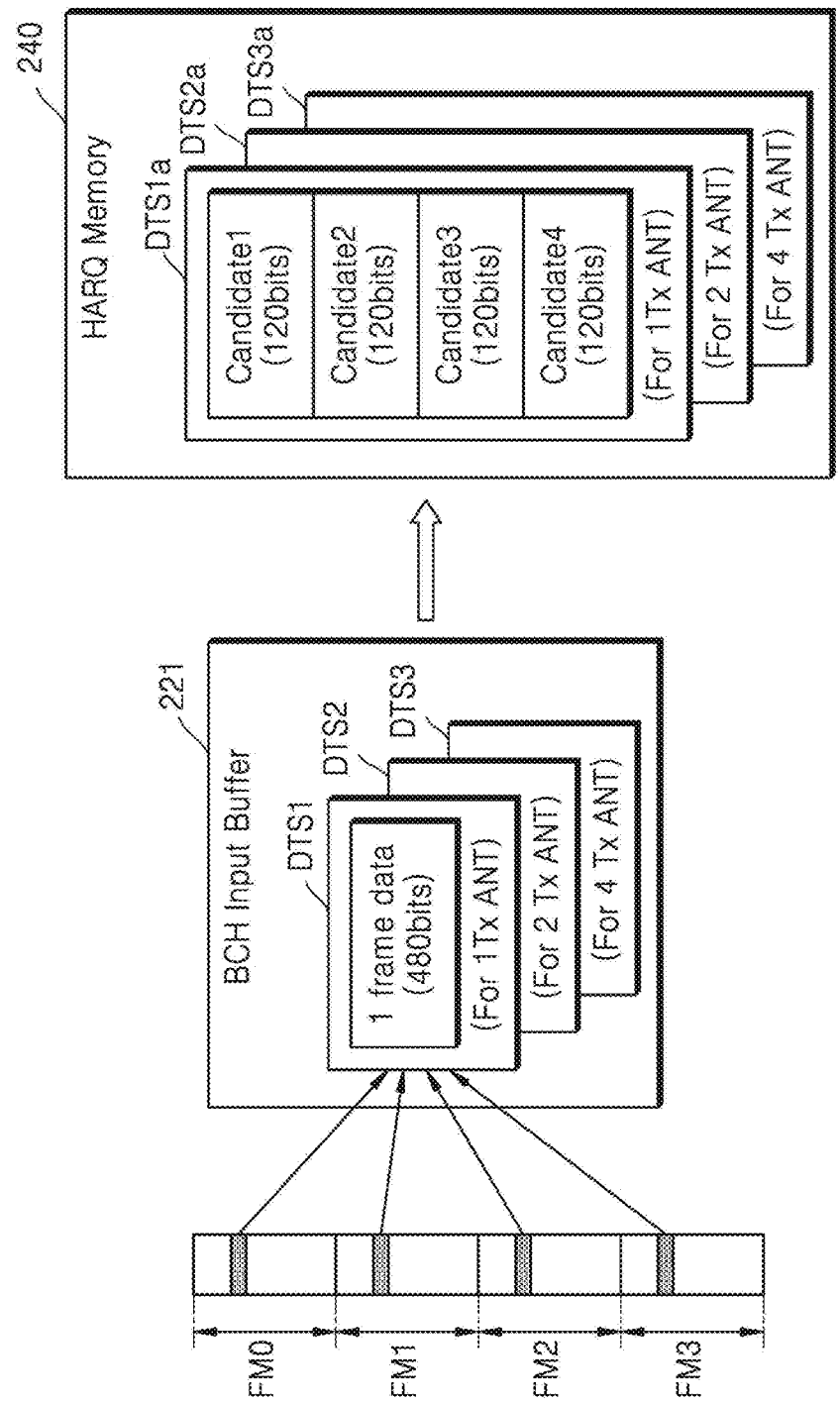

FIGS. 8A and 8B are diagrams illustrating a configuration of a storage area for storing repeatedly transmitted BCH data in a decoding block according to some example embodiments and a decoding block according to a comparative example (the comparative example may represent a conventional approach). FIG. 8A illustrates a configuration of a BCH input buffer 221' in the decoding block according to the comparative example, and FIG. 8B illustrates a configuration of each of a BCH input buffer 221 and an HARQ memory 240 (for example, a third storage area (AR3 of FIG. 6)) for storing repeatedly transmitted BCH data in the decoding block according to some example embodiments.

In the decoding block according to the comparative example, a control channel and a data channel may not share an HARQ processing module (for example, 130 of FIG. 5) and an HARQ memory (for example, 140 of FIG. 5). Referring to FIG. 8A, BCH data may be transmitted once in one frame, and thus, may be repeatedly transmitted four times during a plurality of frames (for example, first to fourth frames FM0 to FM3). The BCH input buffer 221' may store BCH data of four frames, for searching for a timing of a BCH. Also, in initial BCH decoding, a configuration of a transmission antenna of a transmitter may not be known, and thus, BCH data may be stored for each transmission antenna configuration (for example, for each of one transmission antenna configuration, two transmission antenna configurations, and four transmission antenna configurations). Therefore, the BCH input buffer 221' may utilize a storage space for storing three pieces of set data DTS1, DTS2, and DTS3 each including BCH data of four frames. Also, in a case where a receiver supports interference control technology (for example, enhanced inter-cell interference coordination (eICIC)) for controlling frequency interference between base stations, BCH decoding associated with two cells may be used, and thus, the BCH input buffer 221' of FIG. 8A may use three sets.

However, in the decoding block according to some example embodiments, a control channel and a data channel may share an HARQ processing module and an HARQ memory, and BCH data of one frame may be rate de-matched, or may be rate de-matched and HARQ-combined, and may be stored in the HARQ memory. Therefore, as illustrated in FIG. 8B, the BCH input buffer 221 may store BCH data corresponding to one frame, and whenever BCH data is received, the received BCH data may be updated (i.e., stored) in the BCH input buffer 221. However, three pieces of set data DTS1, DTS2, and DTS3 may be stored based on a transmission antenna configuration. Therefore, the BCH input buffer 221 may utilize a storage space for storing the three pieces of set data DTS1, DTS2, and DTS3 each including BCH data of one frame. In data corresponding to a BCH candidate, the amount of data may decrease due to rate de-matching. For example, when each BCH data of one frame including 480 bits is a BCH candidate, candidate data corresponding to the BCH candidate may include 120 bits, based on rate de-matching. The HARQ memory 240 may use a storage space for storing three pieces of set data DTS1a, DTS2a, and DTS3a each including candidate data of four frames, for storing BCH data, and in this case, the received BCH data may be 480 bits before rate de-matching.

Comparing FIG. 8A with FIG. 8B, in a structure of the decoding block according to some example embodiments where a control channel and a data channel share an HARQ processing module and an HARQ memory, a size of a storage space used for storing BCH data may be reduced with respect to a size of a storage space used for storing BCH data in a structure of the decoding block according to the comparative example. In the structure of the decoding block according to some example embodiments, memory use efficiency (for example, efficiency in terms of the size of each of a BCH input buffer and an HARQ memory) may be increased compared to the structure of the decoding block according to the comparative example.

Figure 9A:
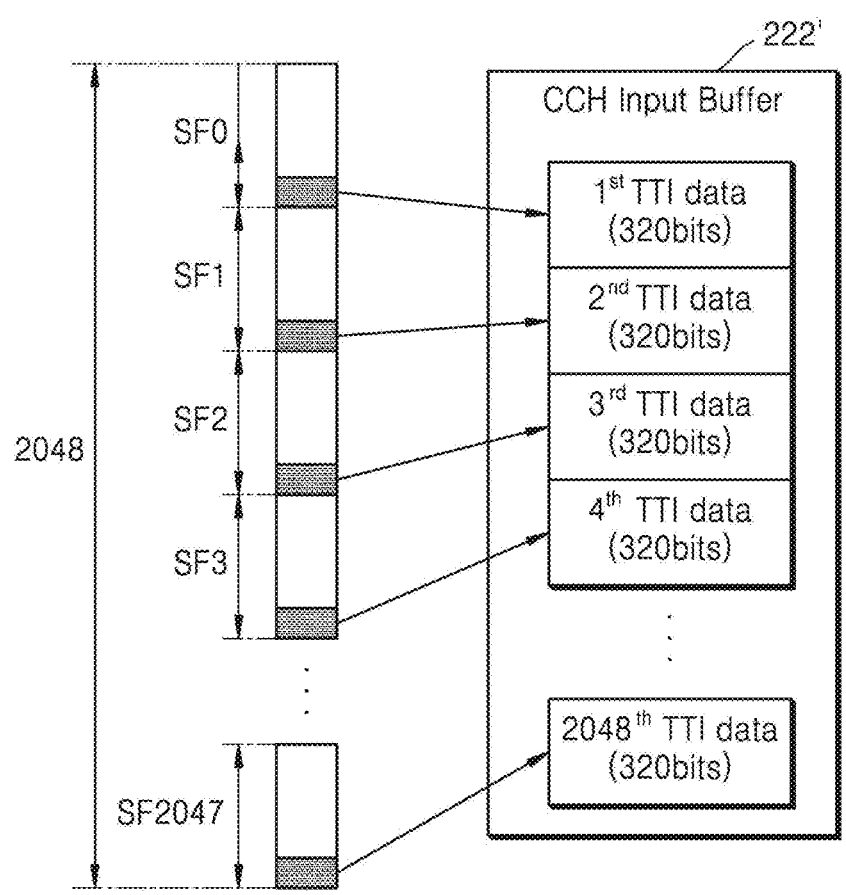

FIGS. 9A and 9B are diagrams illustrating a configuration of a storage area for storing repeatedly transmitted CCH data in a decoding block according to some example embodiments and a decoding block according to a comparative example (the comparative example may correspond to a conventional approach). FIG. 9A illustrates a configuration of a CCH input buffer 222' in the decoding block according to the comparative example, and FIG. 9B illustrates a configuration of each of a CCH input buffer 222 and an HARQ memory 240 (for example, a second storage area (AR2 of FIG. 6)) for storing repeatedly transmitted CCH data in the decoding block according to some example embodiments.

In an IoT-oriented LTE communication system, a CCH may be repeatedly transmitted during a plurality of TTIs (for example, 2,048 TTIs). For example, the CCH may be repeatedly transmitted through first to 2,048 sub-frames SF0 to SF2047.

The decoding block according to the comparative example may use a separate logic for processing a repeatedly transmitted CCH and, as illustrated in FIG. 8A, may use a storage space for storing CCH data repeatedly transmitted 2,048 times in the CCH input buffer 222'.

However, in the decoding block according to some example embodiments, a control channel and a data channel may share an HARQ processing module and an HARQ memory, and CCH data of one frame may be rate de-matched, or may be rate de-matched and HARQ-combined, and may be stored in the HARQ memory. Therefore, as illustrated in FIG. 9B, the CCH input buffer 222 may store CCH data corresponding to one sub-frame, and whenever CCH data is received, the received CCH data may be updated (e.g., stored) in the CCH input buffer 222. Therefore, the CCH input buffer 222 may use a storage space for storing CCH data corresponding to one sub-frame.

In data corresponding to a CCH candidate, the amount of data may decrease due to rate de-matching, and for example, when CCH data of one sub-frame includes 320 bits (e.g., a CCH candidate), candidate data corresponding to the CCH candidate may include 117 bits based on rate de-matching. Also, CCH decoding may not be performed whenever each sub-frame is received but may be performed when determined sub-frames are received, and certain pieces of candidate data for CCH decoding may be stored in the HARQ memory 240. Accordingly, the HARQ memory 240 may use a storage space for storing certain portions of CCH candidate data (for example, first to eighth candidate data).

Comparing FIG. 9A with FIG. 9B, in a structure of the decoding block according to some example embodiments where a control channel and a data channel share an HARQ processing module and an HARQ memory, a size of a storage space used for storing BCH data may be reduced with respect to a size of a storage space used for storing BCH data in a structure of the decoding block according to the comparative example. In the structure of the decoding block according to some example embodiments, memory use efficiency (for example, efficiency in terms of the size of each of a CCH input buffer and an HARQ memory) may be increased compared to the structure of the decoding block according to the comparative example.

Figure 10:
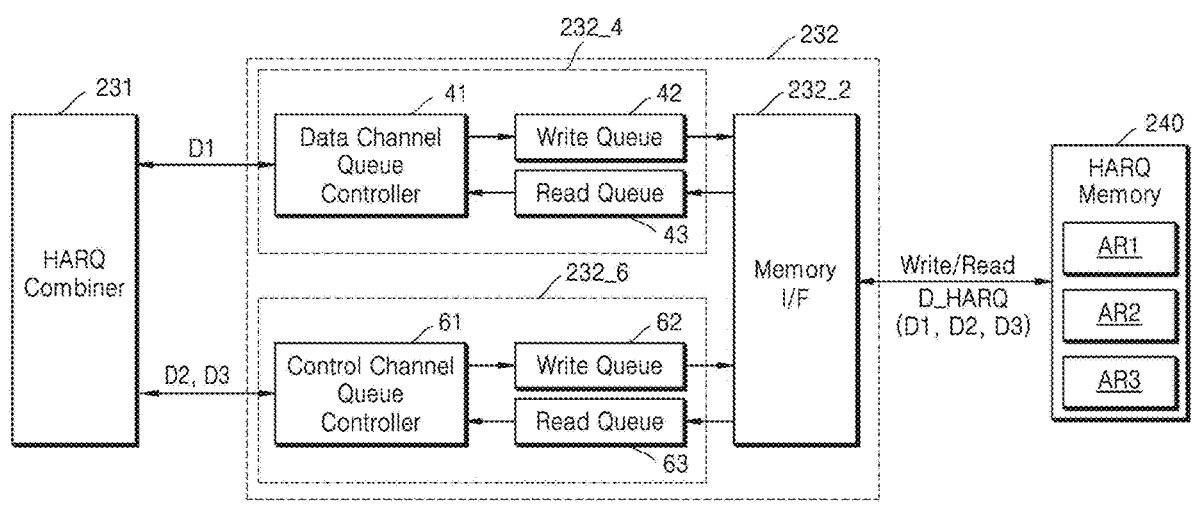
FIG. 10 is a block diagram illustrating an implementation example of a hybrid automatic repeat request (HARQ) memory controller according to some example embodiments.

FIG. 10 is a block diagram illustrating an implementation example of an HARQ memory controller 232 according to some example embodiments.

Referring to FIG. 10, the HARQ memory controller 232 may include a memory interface 232_2, a data channel controller 232_4, and a control channel controller 232_6. The data channel controller 232_4 may control accessing of an HARQ memory 240 so as to store (e.g., save) and/or read HARQ data (e.g., first HARQ data D1) associated with a data channel, and the control channel controller 232_6 may control accessing of the HARQ memory 240 so as to store and/or read HARQ data (for example, second HARQ data D2 and third HARQ data D3) associated with a control channel (for example, a CCH and a BCH). The memory interface 232_2 may respectively write the first to third HARQ data D1 to D3 in storage areas (first to third storage areas) of the HARQ memory 240 in response to a request of each of the data channel controller 232_4 and the control channel controller 232_6.

The data channel controller 232_4 may access the HARQ memory 240 based on a data rate of the first HARQ data D1. The data channel controller 232_4 may include a data channel queue controller 41, a write queue 42, and a read queue 43. In a process where the first HARQ data D1 is stored in a first area AR1 of the HARQ memory 240 and/or is read from the first area AR1, the first HARQ data D1 may be queued in the write queue 42 and/or the read queue 43. The data channel queue controller 41 may control enqueuing and dequeuing of the first HARQ data D1 based on a bandwidth of the memory interface 232_2 and a speed at which the first HARQ data D1 is generated and/or used.

The control channel controller 232_6 may access the HARQ memory 240 based on a data rate of the second HARQ data D2 and the third HARQ data D3. The control channel controller 232_6 may include a control channel queue controller 61, a write queue 62, and a read queue 63. In a process where the second HARQ data D2 is stored in a second area AR2 of the HARQ memory 240 and/or is read from the second area AR2, and/or the third HARQ data D3 is stored in a third area AR3 of the HARQ memory 240 and/or is read from the third area AR3, the second HARQ data D2 and/or the third HARQ data D3 may be queued in the write queue 62 and/or the read queue 63. The control channel queue controller 61 may control enqueuing and dequeuing of the second HARQ data D2 and/or the third HARQ data D3 based on a bandwidth of the memory interface 232_2 and a speed at which the second HARQ data D2 and/or the third HARQ data D3 are generated and/or used. According to some example embodiments, operations described herein as being performed by any or all of the memory interface 232_2, the data channel controller 232_4, the control channel controller 232_6, the data channel queue controller 41, the write queue 42, the read queue 43, the control channel queue controller 61, the write queue 62, and/or the read queue 63 may be performed by at least one processor executing program code that includes instructions corresponding to the operations. The instructions may be stored in a memory of the terminal 20 and/or the base station 10 (e.g., the HARQ memory 140). According to some example embodiments, operations described as being performed by any or all of the memory interface 232_2, the data channel controller 232_4, the control channel controller 232_6, the data channel queue controller 41, the write queue 42, the read queue 43, the control channel queue controller 61, the write queue 62, and/or the read queue 63 may be performed by circuitry. For example, the circuitry may include an ASIC or a FPGA.

Figure 11:
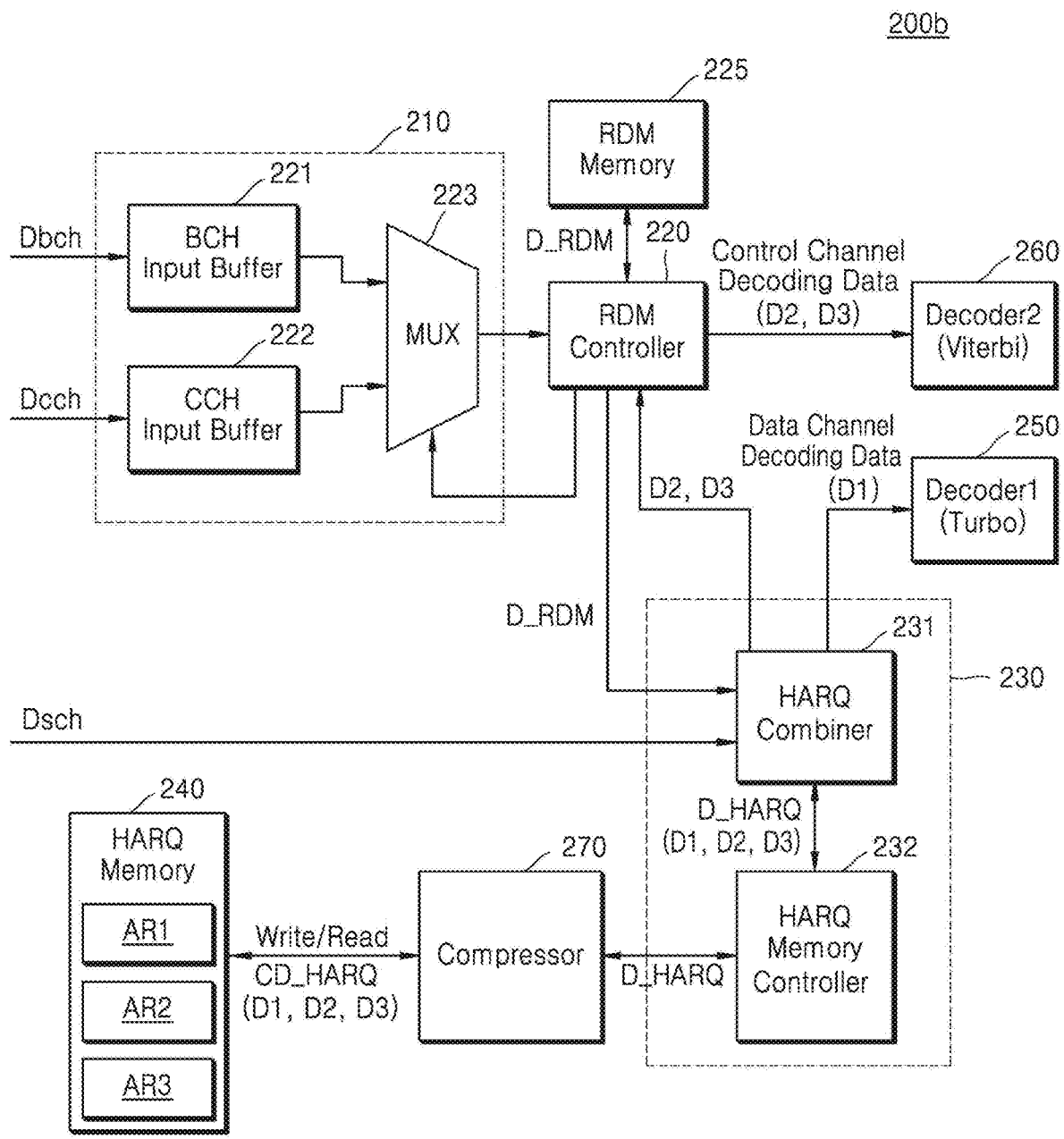
FIG. 11 is a block diagram illustrating a decoding block including a compressor according to some example embodiments.

FIG. 11 is a block diagram illustrating a decoding block 200b according to some example embodiments. FIG. 11 illustrates a modification example of the decoding block of each of FIGS. 6 and 7. Thus, a repetitive description thereof is omitted.

Referring to FIG. 11, the decoding block 200b may further include a compressor 270 between an HARQ memory controller 232 and an HARQ memory 240. The compressor 270 may compress HARQ data D_HARQ and may provide compressed HARQ data CD_HARQ to the HARQ memory 240. The compressed HARQ data CD_HARQ may be written in the HARQ memory 240. In some example embodiments, the compressor 270 may quantize the HARQ data D_HARQ without distortion of the data. The compressor 270 may decompress compressed HARQ data CD_HARQ read from the HARQ memory 240 and may provide decompressed HARQ data D_HARQ to the HARQ memory controller 232. According to some example embodiments, operations described herein as being performed by the compressor 270 may be performed by at least one processor executing program code that includes instructions corresponding to the operations. The instructions may be stored in a memory of the terminal 20 and/or the base station 10 (e.g., the HARQ memory 140). According to some example embodiments, operations described as being performed by the compressor 270 may be performed by circuitry. For example, the circuitry may include an ASIC or a FPGA.

As described above, according to some example embodiments, the HARQ data D_HARQ may be compressed and stored in the HARQ memory 240, thereby enhancing memory use efficiency.

Figure 12:
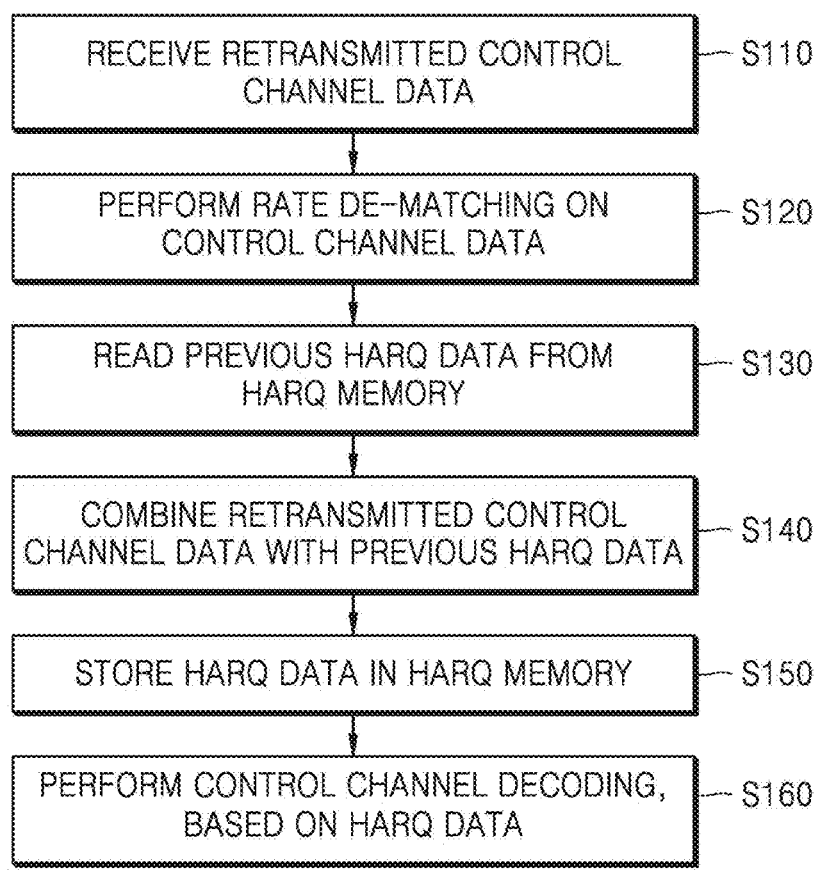
FIG. 12 is a flowchart illustrating a channel decoding method according to some example embodiments.

FIG. 12 is a flowchart illustrating a channel decoding method according to some example embodiments. The channel decoding method of FIG. 12 may be performed by a decoding block (e.g., the decoding block 25) according some example embodiments.

Referring to FIG. 12, in operation S110, retransmitted control channel data (for example, BCH data and/or CCH data) may be received. The decoding block may receive the retransmitted control channel data after demodulation by a detection/demodulation block (e.g., the detection/demodulation block 24 of FIG. 4).

In operation S120, rate de-matching may be performed on the control channel data. Data bits of the control channel data may be combined according to a self-combining process, and thus, rate de-matching may be performed. When the control channel data is initially received, corresponding rate de-matched data may be previously stored in an HARQ memory (e.g., previous HARQ data). When the control channel data is retransmitted, an HARQ combination may be performed on the rate de-matched data based on a below-described process.

In operation S130, previous HARQ data may be read from the HARQ memory. The previous HARQ data may be HARQ data generated based on previously received control channel data and may be stored in the HARQ memory. For example, an HARQ memory controller (e.g., the HARQ memory controller 132 of FIG. 5) may read HARQ data stored in the HARQ memory (e.g., the HARQ memory 240 of FIG. 5) and may provide the read HARQ data as previous HARQ data to an HARQ combiner (e.g., the HARQ combiner 131 of FIG. 5).

In operation S140, the retransmitted control channel data and the previous HARQ data may be combined. The HARQ combiner 131 may perform an HARQ combination on the previous HARQ data and the retransmitted control channel data (e.g., rate de-matched data of the control channel data).

In operation S150, HARQ data generated based on the HARQ combination may be stored in the HARQ memory. The HARQ data may be stored in the HARQ memory so as to be used for an HARQ combination in decoding subsequently received control channel data.

Moreover, in operation S160, control channel decoding may be performed based on the HARQ data. For example, a Viterbi decoder may perform control channel decoding based on HARQ data. The HARQ data may include more information than was received in previously received control channel data, thereby increasing a decoding success probability for decoding the control channel data.

As described above with reference to FIG. 12, in a control channel decoding method according to some example embodiments, repeatedly transmitted control channel data may be rate de-matched, and then, may be combined with previous data (for example, previous HARQ data), based on an HARQ combining process. Control channel decoding may be performed on combined data (e.g., HARQ data), and repeatedly transmitted control channel data (e.g., HARQ data) may be stored in the HARQ memory.

Figure 13:
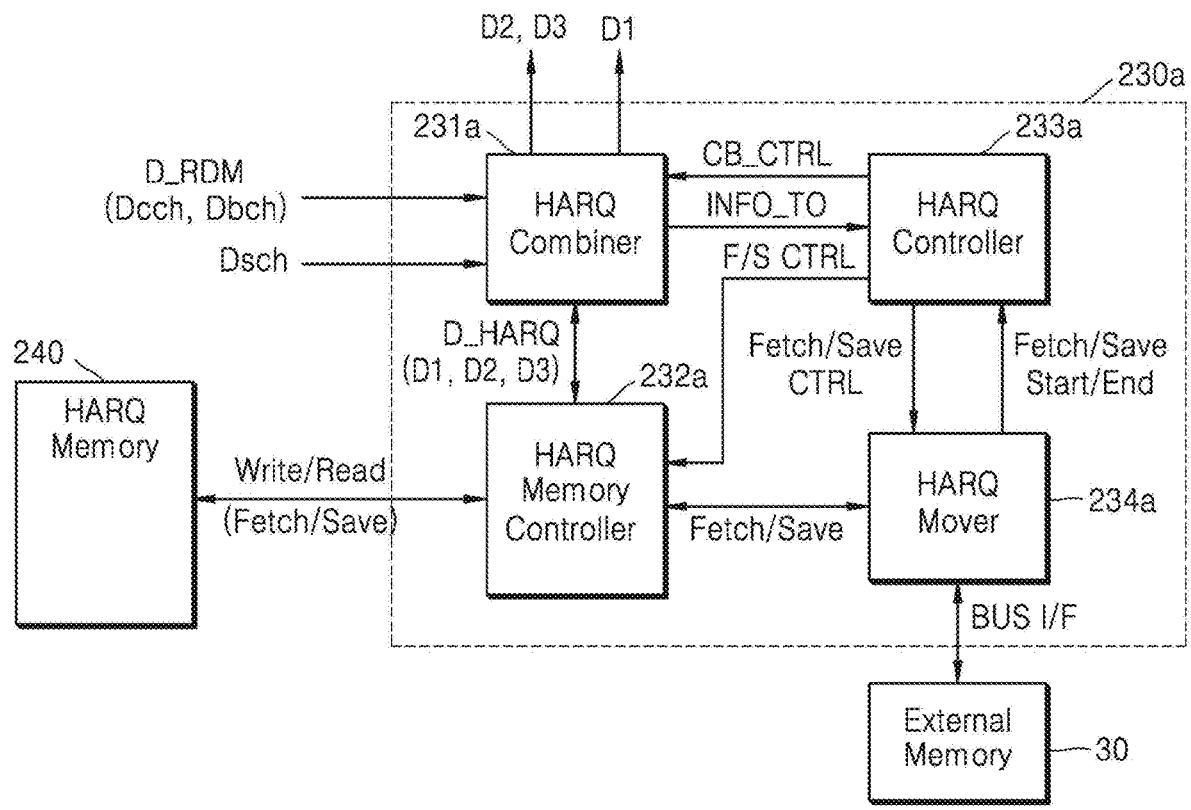
FIG. 13 is a block diagram illustrating an HARQ processing module according to some example embodiments.

FIG. 13 is a block diagram illustrating an HARQ processing module according to some example embodiments. In FIG. 13, an example where HARQ data is stored in an external memory is illustrated. An HARQ processing module 230a of FIG. 13 may be applied to the HARQ processing module 230 of each of FIGS. 6, 7, and 11.

Referring to FIG. 13, the HARQ processing module 230a may include an HARQ combiner 231a, an HARQ memory controller 232a, an HARQ controller 233a, and an HARQ mover 234a. According to some example embodiments, operations described herein as being performed by any or all of the HARQ processing module 230a, the HARQ combiner 231a, the HARQ memory controller 232a, and/or the HARQ mover 234a may be performed by at least one processor (e.g., the HARQ controller 233a) executing program code that includes instructions corresponding to the operations. The instructions may be stored in a memory of the terminal 20 and/or the base station 10 (e.g., the HARQ memory 140).

According to some example embodiments, operations described as being performed by any or all of the HARQ processing module 230a, the HARQ combiner 231a, the HARQ memory controller 232a, the HARQ controller 233a, and/or the HARQ mover 234a may be performed by circuitry. For example, the circuitry may include an ASIC or a FPGA.

Operations of the HARQ combiner 231a and the HARQ memory controller 232a may include operations of the HARQ combiner 231 and the HARQ memory controller 232, respectively, described above with reference to FIG. 6. As described above, the HARQ combiner 231a may perform an HARQ combination on repeatedly transmitted shared channel data (for example, SCH data Dsch) and rate de-matched data D_RDM of control channel data (for example, BCH data Dbch and/or CCH data Dcch) to generate HARQ data D_HARQ (for example, first to third HARQ data D1 to D3). The HARQ memory controller 232a may save (e.g., store) the HARQ data D_HARQ in the HARQ memory 240 and/or may read the stored HARQ data D_HARQ from the HARQ memory 240.

The HARQ controller 233a may control overall operations of the other elements of the HARQ processing module 230a (e.g., the HARQ combiner 231a, the HARQ memory controller 232a, and/or the HARQ mover 234a). For example, the HARQ controller 233a may control the HARQ combining operation of the HARQ combiner 231a, and control an operation of saving and/or fetching the HARQ data D_HARQ in and/or from an external memory 30.

The external memory 30 may denote a memory which transmits and/or receives data through a bus shared by a modem chip into which the HARQ processing module 230a is integrated. The external memory 30 may be DRAM. However, according to some example embodiments, the external memory 30 may include at least one of a volatile memory and/or a non-volatile memory. Examples of the non-volatile memory may include read only memory (ROM), programmable read only memory (PROM), erasable programmable read only memory (EPROM), electrically erasable programmable read only memory (EEPROM), flash memory, phase-change random access memory (PRAM), magnetoresistive random access memory (MRAM), resistive random access memory (RRAM), ferroelectric random access memory (FRAM), etc. Examples of the volatile memory may include various memories such as static random access memory (SRAM), synchronous DRAM (SDRAM), phase-change random access memory (PRAM), magnetoresistive random access memory (MRAM), resistive random access memory (ReRAM), and/or ferroelectric random access memory (FeRAM).

In some example embodiments, the HARQ controller 233a may receive a CRC result after channel decoding and may control an operation of saving the HARQ data D_HARQ to the HARQ memory 240 based on the CRC result. Also, the HARQ controller 233a may receive timeout information Info_TO from the HARQ combiner 231a and may control an operation of saving and/or fetching the HARQ data D_HARQ to and/or from the HARQ memory 240 based on the timeout information Info_TO. In FIG. 13, an example where the HARQ controller 233a receives the timeout information Info_TO from the HARQ combiner 231a is illustrated, but some example embodiments are not limited thereto. In some example embodiments, the timeout information Info_TO may be provided from the HARQ memory controller 232a and/or the HARQ mover 234a.

The HARQ mover 234a may save the HARQ data D_HARQ in the external memory 30 through an interface operation performed on a bus, and/or may fetch the HARQ data D_HARQ from the external memory 30. The HARQ mover 234a may save and/or fetch the HARQ data D_HARQ according to control by the HARQ controller 233a. Also, the HARQ mover 234a may provide the HARQ controller 233a with information representing the start and/or end of an operation of saving and/or fetching the HARQ data D_HARQ.

The HARQ memory 240 may temporarily store the HARQ data D_HARQ until the HARQ data D_HARQ is saved in the external memory 30, and/or may temporarily store the fetched HARQ data D_HARQ until an HARQ combination is completed. The HARQ memory controller 232a may control the transfer of the HARQ data D_HARQ between the HARQ memory 240 and the external memory 30. For example, the HARQ memory controller 232a may provide the HARQ memory 240 with the HARQ data D_HARQ fetched from the external memory 30. Also, the HARQ data D_HARQ may move from the HARQ memory 240 to the external memory 30 according to control by the HARQ memory controller 232a based on the CRC result.

The HARQ controller 233a may control the HARQ mover 234a and the HARQ memory controller 232a to save the HARQ data D_HARQ in the external memory 30 and/or to fetch the HARQ data D_HARQ from the external memory 30. The HARQ memory controller 232a may determine whether the HARQ data D_HARQ is normally saved in the external memory 30, and/or is normally fetched from the external memory 30, based on the timeout information Info_TO provided from the HARQ memory controller 232a and/or the HARQ mover 234a. When the HARQ data D_HARQ is not normally fetched from the external memory 30 (i.e., the HARQ data D_HARQ is not be fetched from the external memory 30 within a predetermined time), there is no HARQ data to be combined with the retransmitted data (i.e., HARQ combining), the HARQ controller 233a may control the HARQ combiner 310 to process retransmitted data as initially transmitted data so that the HARQ combining on the retransmitted data is skipped. Also, when the HARQ data D_HARQ is not normally saved in the external memory 30, the HARQ controller 233a may control the HARQ combiner 310 to process the retransmitted data into the initially transmitted data.

Figure 14:
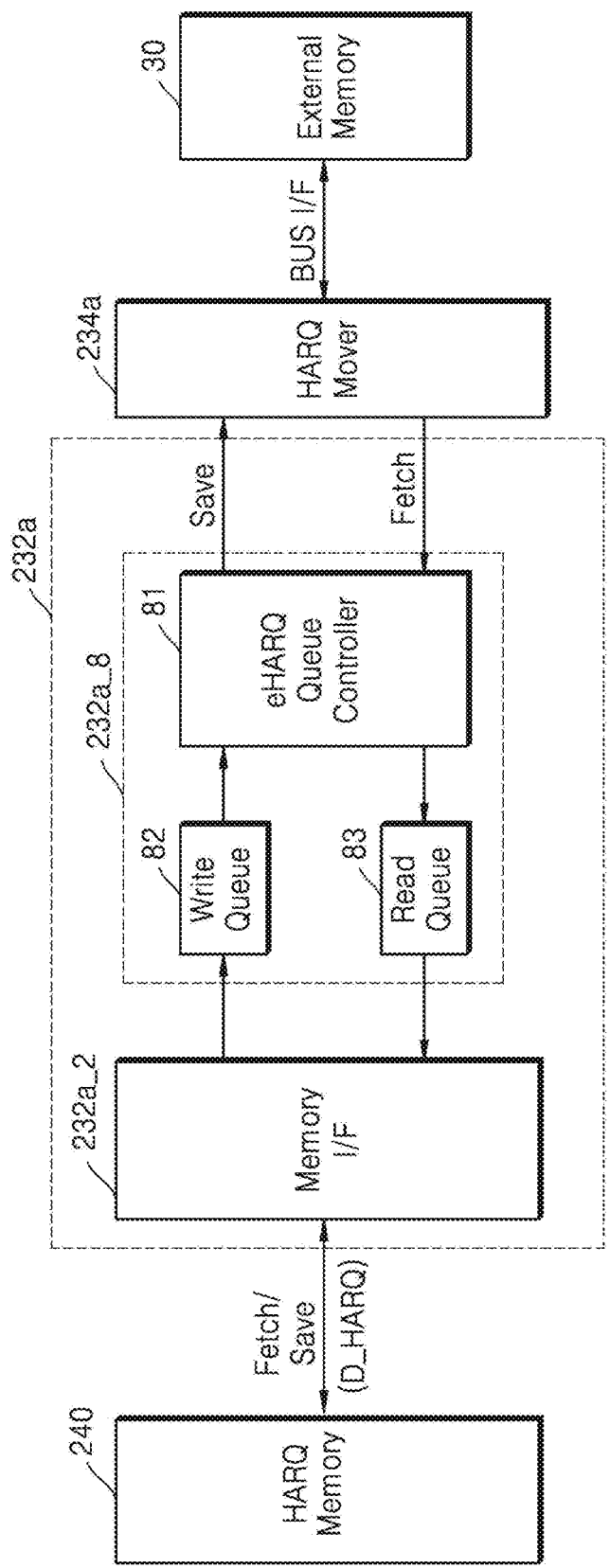
FIG. 14 is a block diagram illustrating an implementation example of the HARQ memory controller of FIG. 13.

FIG. 14 is a block diagram illustrating an implementation example of the HARQ memory controller 232a of FIG. 13. FIG. 14 illustrates a configuration of the HARQ memory controller 232a for transferring the HARQ data D_HARQ between the HARQ memory 240 and the external memory 30.

Referring to FIG. 14, the HARQ memory controller 232a may include a memory interface 232a_2 and an external HARQ controller 232a_8. Also, although not shown, the HARQ memory controller 232a may include the elements (for example, a data channel controller (e.g., the data channel controller 232_4 of FIG. 10) and a control channel controller (e.g., the control channel controller 232_6 of FIG. 10)) of the HARQ memory controller 232 of FIG. 10.

The external HARQ controller 232a_8 may control accessing of the HARQ memory 240 so as to save the HARQ data D_HARQ (for example, first HARQ data of CCH data, second HARQ data of SCH data, and/or third HARQ data of BCH data), temporarily stored in the HARQ memory 240, in the external memory 30 and/or to save the HARQ data D_HARQ fetched from the external memory 30 in the HARQ memory 240.

The external HARQ controller 232a_8 may include an external HARQ queue controller 81, a write queue 82, and a read queue 83. The external HARQ queue controller 81 may control enqueuing and dequeuing of the HARQ data D_HARQ so that the HARQ data D_HARQ is normally saved in the external memory 30 and/or is normally fetched from the external memory 30 based on a bandwidth of the HARQ memory 240, a time enabling the HARQ mover 234a to access the external memory 30, and/or a bandwidth of the external memory 30. The HARQ data D_HARQ is saved in the external memory 30 and/or is fetched from the external memory 30 using the HARQ mover 234a. According to some example embodiments, operations described herein as being performed by any or all of the memory interface 232a_2, the external HARQ controller 232a_8, the external HARQ queue controller 81, the write queue 82, and/or the read queue 83 may be performed by at least one processor executing program code that includes instructions corresponding to the operations. The instructions may be stored in a memory of the terminal 20 and/or the base station 10 (e.g., the HARQ memory 140). According to some example embodiments, operations described as being performed by any or all of the memory interface 232a_2, the external HARQ controller 232a_8, the external HARQ queue controller 81, the write queue 82, and/or the read queue 83 may be performed by circuitry. For example, the circuitry may include an ASIC or a FPGA.

As described above with reference to the HARQ processing module 230a of FIGS. 13 and 14, according to some example embodiments (e.g., as illustrated in FIG. 13), the HARQ data D_HARQ may be saved (e.g., stored) in the external memory 30. When performing decoding, one or more portions of the HARQ data D_HARQ used for decoding may be fetched to the HARQ memory 240 through the HARQ memory controller 232a. Accordingly, a size of the HARQ memory 240 and a size of a modem chip into which the HARQ memory 240 embedded may be reduced.

For example, in a case where a receiver supports eICIC, BCH data (BCH candidate data) of each of a plurality of cells (e.g., third HARQ data of each of the plurality of cells) may be saved in the external memory 30. BCH decoding may be performed by cell, and thus, portions of third HARQ data of the plurality of cells may be fetched to the HARQ memory 240 from the external memory 30 through the HARQ memory controller 232a and may be decoded, for example, sequentially. Therefore, the HARQ memory 240 may use a storage space for storing BCH candidate data corresponding to one cell so as to store BCH data, thereby decreasing a size of the HARQ memory 240. Accordingly, memory use efficiency may increase.

Figure 15:
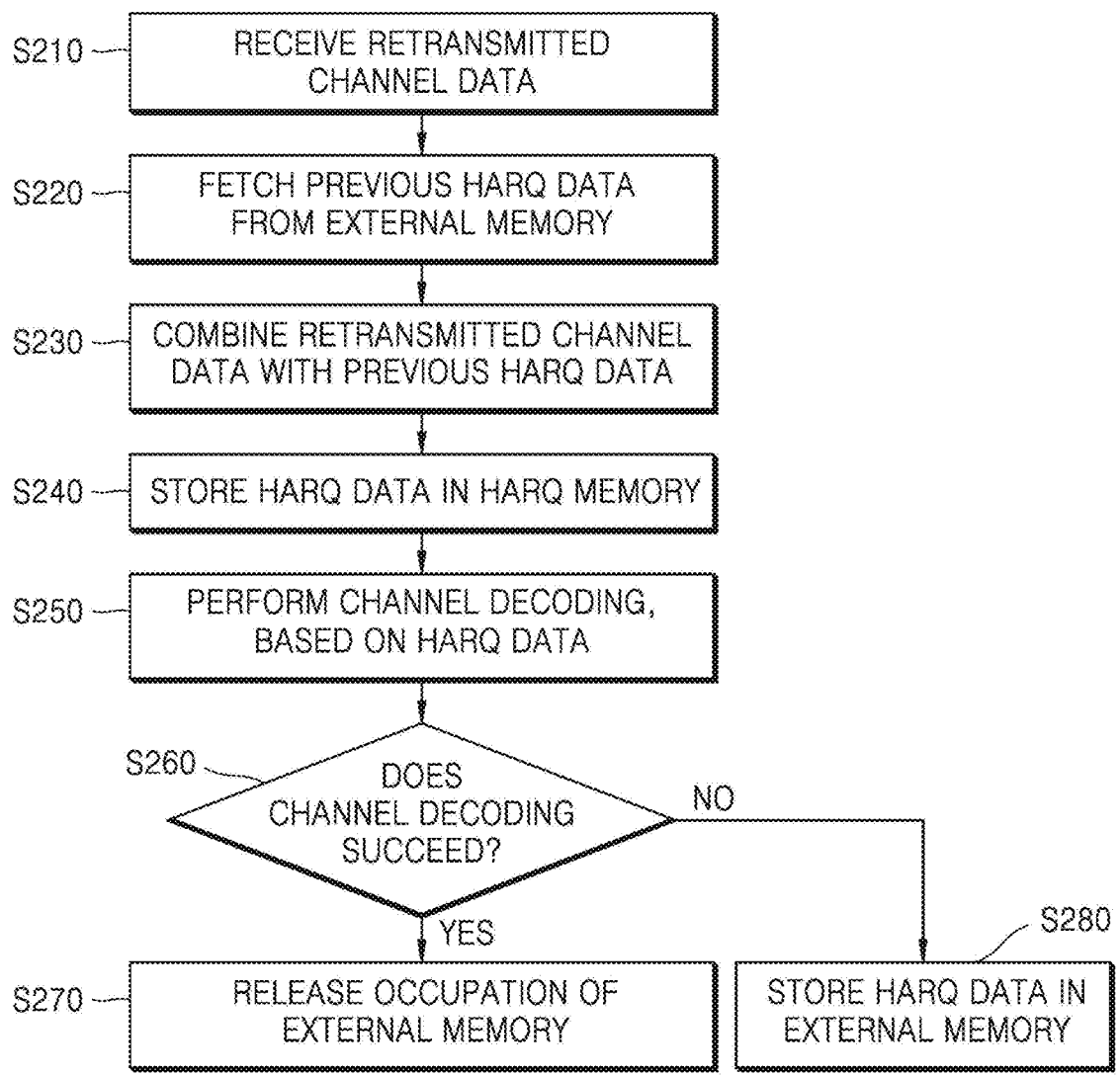
FIG. 15 is a flowchart illustrating a channel decoding method using an external memory according to some example embodiments.

FIG. 15 is a flowchart illustrating a channel decoding method using an external memory according to some example embodiments. The channel decoding method of FIG. 15 represents a decoding process in a case where HARQ data is stored in an external memory (e.g., the external memory 30).

Referring to FIG. 15, in operation S210, retransmitted channel data (for example, SCH data, CCH data, and/or BCH data) may be received. A decoding block may receive the retransmitted channel data as demodulated channel data from a detection/demodulation block (e.g., the detection/demodulation block 24 of FIG. 4). The received retransmitted channel data may be rate de-matched.

In operation S220, previous HARQ data may be fetched from the external memory. For example, when the BCH data is received, previous HARQ data of the BCH data may be fetched from the external memory.

In operation S230, the retransmitted channel data and the previous HARQ data may be combined. An HARQ combiner (e.g., the HARQ combiner 131 of FIG. 5) may perform an HARQ combination on the retransmitted channel data (e.g., rate de-matched data of the retransmitted channel data) and the previous HARQ data.

In operation S240, HARQ data generated based on the HARQ combination may be stored in an HARQ memory, and in operation S250, channel decoding may be performed based on the HARQ data.

In operation S260, a determination of whether the channel decoding succeeds may be performed. For example, whether the channel decoding succeeds may be determined based on a CRC result. In operation S280, when the channel decoding fails, the HARQ data may be stored in the external memory so that the HARQ data may be used for a HARQ combination in decoding performed on subsequently received channel data. In other words, the HARQ data temporarily stored in the HARQ memory may be stored in (e.g., transferred to) the external memory. When the channel decoding succeeds, occupation of the external memory may be released in operation S270 (e.g., the HARQ data stored in the external memory may be released).

In IoT-oriented LTE communication, only HARQ combining may be performed without decoding of the CCH data in some of a plurality of TTIs where the CCH data is transmitted. Therefore, regarding the operations S260 and S270, when the CCH data is received, HARQ data of a CCH may be stored in the external memory regardless of whether decoding succeeds.

Figure 16:
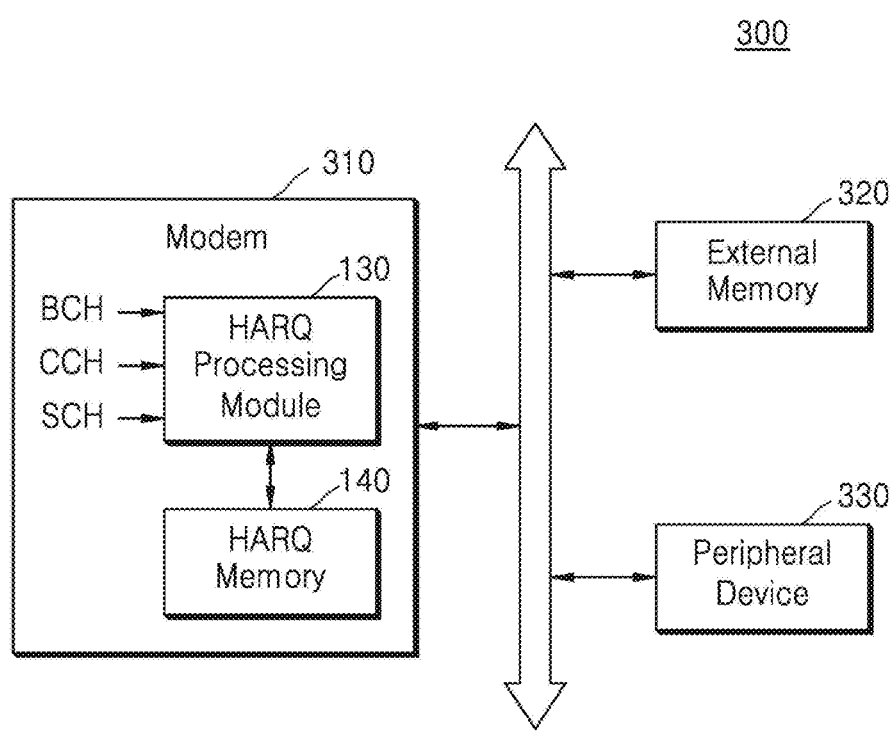
FIG. 16 is a block diagram illustrating a communication device according to some example embodiments.

FIG. 16 is a block diagram illustrating a communication device 300 according to some example embodiments.

The communication device 300 may correspond to various terminals for performing communication, and for example, the communication device 300 may include mobile or fixed user terminals such as UE, MSs, and advanced mobile stations (AMSs). The communication device 300 may be a device for performing 3GPP LTE-based communication. In some example embodiments, the communication device 300 may be an IoT device and/or may be a device for performing wireless communication based on a standard such as IoT-oriented eMTC or NB-IoT.

The communication device 300 may include a modem 310 which processes a baseband signal, an external memory 320 which is outside the modem 310, and at least one peripheral device 330. The modem 310 may correspond to a modem chip which is implemented as a separate semiconductor chip and is equipped in the communication device 300. The communication device 300 may further include an RF chip, and the RF chip may be connected to an antenna to process a high frequency signal. For example, the RF chip may convert the high frequency signal, received through antenna, into a low frequency signal and may transmit the low frequency signal to the modem 310. Also, the RF chip may receive the low frequency signal from the modem 310, convert the low frequency signal into the high frequency signal, and transmit the high frequency signal to the outside (e.g., outside the communication device 300) through the antenna. According to some example embodiments, operations described herein as being performed by the modem 310 may be performed by at least one processor executing program code that includes instructions corresponding to the operations. The instructions may be stored in a memory of the terminal 20 (e.g., the HARQ memory 140). According to some example embodiments, operations described as being performed by the modem 310 may be performed by circuitry. For example, the circuitry may include an ASIC or a FPGA.

According to some example embodiments, an application processor including functions performed by the modem 310 may be provided, and the modem 310 may be an element included in the application processor. In this case, the above-described modem chip may be referred to as an application processor.

Moreover, according to some example embodiments, the external memory 320 illustrated in FIG. 16 may be a memory which the modem 310 and the peripheral device 330 access through a common bus. For example, the external memory 320 may be implemented as SRAM, DRAM, SDRAM, double date rate (DDR) SDRAM, or the like. Also, the peripheral device 330 may be a device which is included in the communication device 300 and accesses the external memory 320, and for example, the peripheral device 330 may be various kinds of devices, such as a complementary metal-oxide semiconductor (CMOS) image sensor and/or a CPU for processing data. Also, when the communication device 300 includes the application processor and the modem 310 is implemented as a semiconductor chip separate from the application processor, the peripheral device 330 may correspond to the application processor. In some example embodiments, the communication device 300 may further include peripheral devices such as non-volatile devices including a sensor, an input/output device, a power supply, and/or a storage device (for example, a hard disk drive (HDD), a solid state disk (SSD), an embedded multimedia card (eMMC), an universal flash storage (UFS), or the like).

The modem 310 may include an HARQ processing module 130 and an HARQ memory 140. The HARQ processing module 130 and the HARQ memory 140 according to some of the above-described example embodiments may be applied to the modem 310. The HARQ processing module 130 may perform an HARQ combination on repeatedly transmitted data of a data channel (for example, a SCH) and repeatedly transmitted data of control channels (for example, a BCH and/or a CCH). Combined data (e.g., HARQ data) may be stored in the HARQ memory 140. Alternatively, the HARQ data may be temporarily stored in the HARQ memory 140, and then, may be stored in the external memory 320.

In the communication device 300 according to some example embodiments, the data channel and the control channels may share the HARQ processing module 130 and the HARQ memory 140. Accordingly, an area of a circuit for processing the data channel and the control channels may decrease, and memory use efficiency may increase. Also, the HARQ data may be stored in the external memory 320, and thus, a size of the HARQ memory 140 may decrease and memory use efficiency may increase.

The various operations of methods described above may be performed by any suitable means capable of performing the operations, such as various hardware and/or software implemented in some form of hardware (e.g., processor, ASIC, etc.).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or operations of a method or algorithm and functions described in connection with the example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concepts have been particularly shown and described with reference to some example embodiments thereof, it will be understood that various changes in form and details may be made therein without departing from the spirit and scope of the following claims.

What is claimed is:

1. A channel decoding method of a receiver, the method comprising:
   receiving current control channel data among repeatedly transmitted control channel data;
   reading previous first combining data from a memory, the previous first combining data being based on previously received control channel data among the repeatedly transmitted control channel data;
   performing, by a combiner based on soft combining, first combining on the current control channel data by combining the current control channel data and the previous first combining data to generate current first combining data; and
   decoding, by a first decoder, the current first combining data.

2. The method of claim 1, further comprising:
   receiving shared channel data repeatedly transmitted based on a hybrid automatic repeat request (HARQ);
   performing, by the combiner based on the soft combining, second combining on the shared channel data by combining the shared channel data and previous second combining data to generate second combining data; and
   decoding, by a second decoder, the second combining data.

3. The method of claim 2, wherein a decoding technique of the second decoder is different from a decoding technique of the first decoder.

4. The method of claim 1, wherein the current control channel data comprises at least one of broadcast channel data and downlink control channel data.

5. The method of claim 2, wherein
   the current control channel data comprises at least one of broadcast channel data and downlink control channel data,
   the broadcast channel data and shared channel data are received through a same sub-frame, and
   wherein the combiner is configured to perform the first combining on the broadcast channel data, and then perform the second combining on the shared channel data.

6. The method of claim 2, wherein
   the current control channel data comprises at least one of broadcast channel data and downlink control channel data,
   the downlink control channel data and shared channel data are received through different sub-frames, and
   wherein the combiner is configured to perform the first combining on the downlink control channel data, and then perform the second combining on the shared channel data.

7. The method of claim 1, further comprising:
   storing the current first combining data as the previous first combining data to the memory.

8. The method of claim 7, wherein the storing the current first combining data comprises:
   compressing the current first combining data; and
   storing the compressed current first combining data to the memory.

9. The method of claim 1, further comprising:
   performing, by a rate de-matching controller, rate de-matching on the current control channel data; and
   wherein the first combining comprises combining the rate de-matched data and the previous first combining data.

10. A method of processing shared channel data repeatedly received based on a hybrid automatic repeat request (HARQ) and control channel data repeatedly received using a combiner based on a soft combining, the method comprising:
    receiving current control channel data among the control channel data;
    performing, by a rate de-matching controller, rate de-matching on the current control channel data;
    combining, by the combiner, the rate de-matched data and previous first combining data to generate current first combining data, the previous first combining data being based on previously received control channel data among the control channel data;
    receiving the shared channel data; and
    combining, by the combiner, the shared channel data and previous second combining data to generate second combining data.

11. The method of claim 10, further comprising:
    decoding, by a first decoder based on a first decoding technique, the current first combining data; and
    decoding, by a second decoder based on a second decoding technique, the second combining data,
    wherein the second decoding technique is different from the first decoding technique.

12. The method of claim 10, wherein the previous first combining data and the previous second combining data are read from a memory.

13. The method of claim 12, further comprising:
    storing the current first combining data as the previous first combining data to the memory; and
    storing the second combining data as the previous second combining data to the memory.

14. A modem chip for processing shared channel data repeatedly received based on a hybrid automatic repeat request (HARQ) and control channel data repeatedly received, the modem chip comprising:
    an input buffer circuit configured to receive and store the control channel data; and
    a rate de-matching controller configured to perform rate de-matching on the control channel data; and
    an HARQ processing module configured to perform combining on each of the control channel data and the shared channel data in a soft combining manner; and
    a memory configured to store combining data received from the HARQ processing module.

15. The modem chip of claim 14, wherein
    the HARQ processing module is configured to perform the combining on current control channel data among the control channel data by combining rate de-matched data of the current control channel data and previous first combining data from the memory to generate current first combining data, the previous first combining data being based on previously received control channel data among the control channel data, and configured to perform the combining on the shared channel data by combining the shared channel data and previous second combining data from the memory to generate second combining data.

16. The modem chip of claim 15, further comprising;
a first decoder configured to decode current first combining data, using a first decoding technique; and
a second decoder configured to decode second combining data, using a second decoding technique different from the first decoding technique.

17. The modem chip of claim 14, wherein the input buffer circuit comprises:
a first input buffer configured to receive and store broadcast channel data;
a second input buffer configured to receive and store downlink control channel data; and
a selector configured to selectively provide the broadcast channel data and the downlink control channel data to the rate de-matching controller in response to a control signal of the rate de-matching controller.

18. The modem chip of claim 17, wherein the first input buffer stores a plurality of data sets according to an antenna configuration of a transmitter which transmits the broadcast channel data, and each of the plurality of data sets includes the broadcast channel data corresponding to one frame, and
the memory stores a plurality of combining data sets according to the antenna configuration of the transmitter, and each of the plurality of combining data sets includes rate de-matched broadcast channel data corresponding to four frames.

19. The modem chip of claim 17, wherein the second input buffer stores the downlink control channel data corresponding to one sub-frame, and
the memory stores a plurality of pieces of rate de-matched downlink control channel data.

20. The modem chip of claim 14, wherein the modem chip is equipped in an Internet of Things (IoT) device.

* * * * *